US012656543B2

(12) United States Patent
Hnatovsky et al.

(10) Patent No.: US 12,656,543 B2
(45) Date of Patent: Jun. 16, 2026

(54) PHASE-SHIFTED FIBER BRAGG GRATING SENSOR AND METHOD FOR PRODUCING SAME

(71) Applicant: NATIONAL RESEARCH COUNCIL OF CANADA, Ottawa (CA)

(72) Inventors: Cyril Hnatovsky, Ottawa (CA); Dan Grobnic, Ottawa (CA); Stephen Mihailov, Kanata (CA); Robert Walker, Spencerville (CA); Ping Lu, Ottawa (CA); Huimin Ding, Nepean (CA); David Coulas, Ottawa (CA); Kasthuri De Silva, Milton (CA)

(73) Assignee: NATIONAL RESEARCH COUNCIL OF CANADA, Ottawa (CA)

( * ) Notice: Subject to any disclaimer, the term of this patent is extended or adjusted under 35 U.S.C. 154(b) by 294 days.

(21) Appl. No.: 18/331,218

(22) Filed: Jun. 8, 2023

(65) Prior Publication Data

US 2023/0333313 A1     Oct. 19, 2023

Related U.S. Application Data

(62) Division of application No. 17/133,929, filed as application No. PCT/IB2019/055099 on Jun. 18, 2019, now abandoned.

(60) Provisional application No. 62/689,894, filed on Jun. 26, 2018.

(51) Int. Cl.
| | |
|---|---|
| *G02B 6/02* | (2006.01) |
| *G01N 21/77* | (2006.01) |
| *G02B 5/18* | (2006.01) |
| *G02B 6/293* | (2006.01) |

(52) U.S. Cl.
CPC ....... *G02B 6/02138* (2013.01); *G01N 21/774* (2013.01); *G02B 5/18* (2013.01); *G02B 6/29356* (2013.01); *G01N 2201/06113* (2013.01)

(58) Field of Classification Search
CPC .. G02B 6/02138; G02B 5/18; G02B 6/29356; G01N 21/774; G01N 2201/06113
See application file for complete search history.

(56) References Cited

U.S. PATENT DOCUMENTS

| | | | |
|---|---|---|---|
| 4,807,950 A | 2/1989 | Glenn et al. | |
| 4,895,423 A | 1/1990 | Bilodeau et al. | |
| 5,007,705 A | 4/1991 | Morey et al. | |

(Continued)

FOREIGN PATENT DOCUMENTS

| | | | | |
|---|---|---|---|---|
| CA | 2768261 A1 * | 1/2011 | ......... | C03C 25/6208 |
| CA | 2768718 A1 | 2/2011 | | |

(Continued)

OTHER PUBLICATIONS

Kashyap et al. (UV written reflection grating structures in photosensitive optical fibres using phase-shifted phase masks, Electronics Letters, vol. 30, No. 23, pp. 1977-1978; Nov. 10, 1994). (Year: 1994).*

(Continued)

*Primary Examiner* — Michelle R Connelly
(74) *Attorney, Agent, or Firm* — Perry + Currier Inc.

(57) ABSTRACT

T-phase-shifted fiber Bragg gratings in optical waveguides, and methods of formation thereof. Sensing apparatus comprising such gratings using femtosecond pulse duration lasers and specialized transmission diffraction elements or phase masks.

4 Claims, 15 Drawing Sheets

(56) References Cited

U.S. PATENT DOCUMENTS

| | | | |
|---|---|---|---|
| 5,104,209 A | 4/1992 | Hill et al. | |
| 5,287,417 A | 2/1994 | Atkins et al. | |
| 5,367,588 A | 11/1994 | Hill et al. | |
| 5,400,422 A | 3/1995 | Askins et al. | |
| 5,532,493 A | 7/1996 | Hale et al. | |
| 5,761,111 A | 6/1998 | Glezer | |
| 5,771,251 A | 6/1998 | Kringlebotn et al. | |
| 5,830,622 A | 11/1998 | Canning et al. | |
| 5,861,020 A | 1/1999 | Schwarzmaier | |
| 5,976,390 A | 11/1999 | Muramatsu | |
| 6,072,926 A | 6/2000 | Cole et al. | |
| 6,334,018 B1 | 12/2001 | Fokine | |
| 6,404,956 B1 | 6/2002 | Brennan et al. | |
| 6,878,900 B2 | 4/2005 | Corkum et al. | |
| 6,884,960 B2 | 4/2005 | Bourne et al. | |
| 6,888,125 B2 | 5/2005 | Ronnekleiv et al. | |
| 6,907,165 B2 | 6/2005 | Liu et al. | |
| 6,993,221 B2 | 1/2006 | Mihailov et al. | |
| 7,031,571 B2 | 4/2006 | Mihailov et al. | |
| 7,033,519 B2 | 4/2006 | Taylor et al. | |
| 7,171,093 B2 | 1/2007 | Kringlebotn et al. | |
| 7,228,017 B2 | 6/2007 | Xia et al. | |
| 7,245,795 B2 | 7/2007 | Walker et al. | |
| 7,323,677 B1 | 1/2008 | Wang | |
| 7,379,643 B2 | 5/2008 | Mihailov et al. | |
| 7,394,837 B2 | 7/2008 | Shevy et al. | |
| 7,438,824 B2 | 10/2008 | Taylor et al. | |
| 7,483,615 B2 | 1/2009 | Mihailov et al. | |
| 7,515,792 B2 | 4/2009 | Mihailov et al. | |
| 7,568,365 B2 | 8/2009 | Schaffer et al. | |
| 7,574,075 B2 | 8/2009 | Xia | |
| 7,606,452 B2 | 10/2009 | Bilodeau et al. | |
| 7,689,087 B2 | 3/2010 | Mihailov et al. | |
| 7,835,605 B1 | 11/2010 | Wang et al. | |
| 8,272,236 B2 | 9/2012 | Smelser et al. | |
| 8,402,789 B2 * | 3/2013 | Smelser | G02B 6/02138 |
| | | | 65/424 |
| 8,515,224 B2 | 8/2013 | Vallee et al. | |
| 8,727,613 B2 | 5/2014 | Mihailov | |
| 8,737,780 B2 | 5/2014 | Vallee et al. | |
| 8,849,080 B1 | 9/2014 | Manzur | |
| 9,696,476 B1 | 7/2017 | Glebov et al. | |
| 10,141,709 B2 | 11/2018 | Ishaaya et al. | |
| 10,156,680 B2 | 12/2018 | Grobnic et al. | |
| 10,520,669 B2 | 12/2019 | Mihailov et al. | |
| 10,551,610 B2 | 2/2020 | Brassard et al. | |
| 10,886,125 B1 | 1/2021 | Haick et al. | |
| 11,359,939 B2 | 6/2022 | Grobnic et al. | |
| 11,698,302 B2 | 7/2023 | Waltermann | |
| 2002/0041724 A1 | 4/2002 | Ronnekleiv et al. | |
| 2003/0174947 A1 | 9/2003 | Sweetser et al. | |
| 2004/0184731 A1 | 9/2004 | Mihailov et al. | |
| 2004/0184734 A1 | 9/2004 | Mihailov et al. | |
| 2004/0258377 A1 | 12/2004 | Berkey et al. | |
| 2006/0029322 A1 | 2/2006 | Mihailov et al. | |
| 2006/0219676 A1 | 10/2006 | Taylor et al. | |
| 2006/0251367 A1 | 11/2006 | Seifert et al. | |
| 2008/0310789 A1 | 12/2008 | Mihailov et al. | |
| 2009/0317928 A1 | 12/2009 | Smelser et al. | |
| 2011/0087112 A1 | 4/2011 | Leo et al. | |
| 2012/0039567 A1 | 2/2012 | Herman et al. | |
| 2012/0106893 A1 | 5/2012 | Kashyap et al. | |
| 2016/0226220 A1 | 8/2016 | Kanskar | |
| 2017/0192168 A1 | 7/2017 | Grobnic et al. | |
| 2017/0299806 A1 | 10/2017 | Kopp | |
| 2018/0067254 A1 | 3/2018 | Mihailov et al. | |
| 2019/0049272 A1 | 2/2019 | Grobnic et al. | |
| 2021/0318488 A1 | 10/2021 | Hnatovsky et al. | |
| 2023/0194775 A1 | 6/2023 | Hnatovsky et al. | |
| 2023/0333313 A1 | 10/2023 | Hnatovsky et al. | |
| 2024/0012195 A1 | 1/2024 | Hnatovsky et al. | |

FOREIGN PATENT DOCUMENTS

| | | | | |
|---|---|---|---|---|
| CN | 101349779 A | 1/2009 | | |
| CN | 102162874 A | 8/2011 | | |
| CN | 102226847 A | 10/2011 | | |
| CN | 102576125 A | 7/2012 | | |
| CN | 105158709 A | 12/2015 | | |
| CN | 109581580 A | 4/2019 | | |
| EP | 0978738 A1 | 2/2000 | | |
| EP | 1341012 A2 | 3/2003 | | |
| EP | 2460038 A1 | 6/2012 | | |
| GB | 2514326 A | 11/2014 | | |
| JP | H1138592 A | 2/1999 | | |
| JP | 2000134153 A | 5/2000 | | |
| JP | 2004506869 A * | 3/2004 | | G01L 11/025 |
| JP | 6220868 B2 * | 10/2017 | | G01H 9/004 |
| WO | WO-2005111677 A2 | 11/2005 | | |
| WO | WO-200713742 A1 | 12/2007 | | |
| WO | WO-2011011890 A1 | 2/2011 | | |
| WO | WO-2015154177 A1 | 10/2015 | | |
| WO | WO-2017141188 A1 | 8/2017 | | |
| WO | WO - 2020170047 A1 | 8/2020 | | |

OTHER PUBLICATIONS

Alemohammad et al., Machine Translation of CA 2768261 A1, Jan. 20, 2011. (Year: 2011).*

Machine Translation of JP 6220868 B2, Oct. 25, 2017. (Year: 2017).*

Machine Translation of JP 2004-506869 A, Mar. 4, 2004. (Year: 2004).*

CN105158709A Machine translation, Dec. 2015.

JP2004506869A Machine translation, Mar. 2004.

PCT/IB2020/061551, Low Scattereng Loss High Temperature Stable Fiber Bragg Grating Sensor Based on Micropore Formation and Method for Producing Same, Dec. 4, 2020.

U.S. Appl. No. 18/255,148, Low Scattering Loss High Temperature Stable Fiber Bragg Grating Sensor Based on Micropore Formatiion and Method for Producing Same, May 31, 2023.

PCT/IB2019/055099, Phase-Shifted Fiber Bragg Grating Sensor and Method for Producing Same, Jun. 18, 2019.

U.S. Appl. No. 17/133,929, Phase-Shifted Fiber Bragg Grating Sensor and Method for Producing Same, Dec. 24, 2020.

Thomas, Jens, et al. "Cladding mode coupling in highly localized fiber Bragg gratings: modal properties and transmission spectra." Optics express 19.1 (2011): 325-341.

Grobnic, Dan, et al. "Growth dynamics of type II gratings made with ultrafast radiation." Optical Sensors. Optical Society of America, 2014.

Walker, Robert B., et al. "Entrained-flow gasifier and fluidized-bed combustor temperature monitoring using arrays of fs-IR written fiber Bragg gratings." 24th International Conference on Optical Fibre Sensors. vol. 9634. International Society for Optics and Photonics, 2015.

Riant, Isabelle et al. "Study of the photosensitivity at 193 nm and comparison with photosensitivity at 240 nm influence of fiber tension: type IIa aging." Journal of lightwave technology 15.8 (1997): 1464-1469.

Mihailov, Stephen J., et al. "Bragg grating inscription in various optical fibers with femtosecond infrared lasers and a phase mask." Optical Materials Express 1.4 (2011): 754-765.

Li, Yuhua, et al. "Fiber Bragg gratings with enhanced thermal stability by residual stress relaxation." Optics express 17.22 (2009): 19785-19790.

Chen, Kevin P., et al. "Self-heated fiber Bragg grating sensors." Applied Physics Letters 86.14 (2005): 143502.

Cavillon, Maxime, et al. "Overview of high temperature fibre Bragg gratings and potential improvement using highly doped aluminosilicate glass optical fibres." Journal of Physics: Photonics 1.4 (2019): 042001.

Bernier, M., et al. "Ytterbium fiber laser based on first-order fiber Bragg gratings written with 400nm femtosecond pulses and a phase-mask." Optics express 17.21 (2009): 18887-18893.

(56)          References Cited

OTHER PUBLICATIONS

Smelser, Christopher W. et al. "Formation of Type I-IR and Type II-IR gratings with an ultrafast IR laser and a phase mask." Optics express 13.14 (2005): 5377-5386.

Martinez, Arns, et al. "Direct writing of fibre Bragg gratings by femtosecond laser." Electronics Letters 40.19 (2004): 1170-1172.

Allsop, T., et al. "Refractive index sensing with long-period grating fabricated in biconical tapered fibre." Electronics letters 41.8 (2005): 471-472.

Beresna, M. et al., "Polarization sensitive elements fabricated by femtosecond laser nanostructuring of glass." Optical Materials Express 1.4 (2011): 783-795.

Bernier, Martin, et al. "All-fiber DFB laser operating at 2.8 μm." Optics letters 40.1 (2015): 81-84.

Du, Yong, et al. "Fabrication of phase-shifted fiber Bragg grating by femtosecond laser shield method." IEEE Photonics Technology Letters 29.24 (2017): 2143-2146.

Grobnic, D., et al. "Bragg grating evanescent field sensor made in biconical tapered fiber with femtosecond IR radiation." IEEE Photonics Technology Letters 18.1 (2006): 160-162.

He, Jun, et al. "Highly birefringent phase-shifted fiber Bragg gratings inscribed with femtosecond laser." Optics letters 40.9 (2015): 2008-2011.

Hnatovsky, Cyril, et al., "Nonlinear photoluminescence imaging applied to femtosecond laser manufacturing of fiber Bragg gratings." Optics express 25.13 (2017): 14247-14259.

Hnatovsky, Cyril, et al. "Self-organized nanostructure formation during femtosecond-laser inscription of fiber Bragg gratings." Optics letters 42.3 (2017): 399-402.

Hoo, Yeuk L., et al. "Design and modeling of a photonic crystal fiber gas sensor." Applied Optics 42.18 (2003): 3509-3515.

Iadicicco, Agostino, et al. "Thinned fiber Bragg gratings as high sensitivity refractive index sensor." IEEE Photonics Technology Letters 16.4 (2004): 1149-1151.

Kashyap, R. et al., "UV written reflection grating structures in photosensitive optical fibres using phase-shifted phase masks." Electronics Letters 30.23 (1994): 1977-1978.

Keren, S. et al., "Distributed three-dimensional fiber Bragg grating refractometer for biochemical sensing." Optics letters 28.21 (2003): 2037-2039.

Loh, W. H. et al., "1.55 μm phase-shifted distributed feedback fibre laser." Electronics Letters 31.17 (1995): 1440-1442.

Love, J. D., et al. "Tapered single-mode fibres and devices. Part 1: Adiabaticity criteria." IEE Proceedings J (Optoelectronics) 138.5 (1991): 343-354.

Marshall, Graham D., et al. "Point-by-point written fiber-Bragg gratings and their application in complex grating designs." Optics express 18.19 (2010): 19844-19859.

Schroeder, Kerstin, et al. "A fibre Bragg grating refractometer." Measurement Science and Technology 12.7 (2001): 757-764.

Sheng, Yunlong et al., "Near-field diffraction of irregular phase gratings with multiple phase-shifts." Optics express 13.16 (2005): 6111-6116.

Silva, Susana, et al. "H 2 sensing based on a Pd-coated tapered-FBG fabricated by DUV femtosecond laser technique." IEEE photonics technology letters 25.4 (2013): 401-403.

Tremblay, Guillaume et al., "Effects of the phase shift split on phase-shifted fiber Bragg gratings." Journal of the Optical Society of America B Optical Physics 23.8 (2006): 1511-1516.

Villatoro, J. et al., "High resolution refractive index sensing with cladded multimode tapered optical fibre." Electronics letters 40.2 (2004): 106-107.

Wu, Qi et al., "High-sensitivity ultrasonic phase-shifted fiber Bragg grating balanced sensing system." Optics express 20.27 (2012): 28353-28362.

Mihailov, Stephen J. "Chapter 6: Femtosecond laser-inscribed fiber Bragg gratings for sensing applications." Opto-Mechanical Fiber Optic Sensors. Butterworth-Heinemann, 2018. 137-174.

Dostovalov, A. V., et al. "Point-by-point inscription of phase-shifted fiber Bragg gratings by femtosecond IR radiation in passive and active rare-earth doped optical fibers." 2017 Progress in Electromagnetics Research Symposium-Spring (PIERS). IEEE, 2017.

Swanton, A., et al. "Use of e-beam written, reactive ion etched, phase masks for the generation of novel photorefractive fibre gratings." Microelectronic engineering 30.1-4 (1996): 509-512.

Burgmeier, Jörg, et al. "Point-by-point inscription of phase-shifted fiber Bragg gratings with electro-optic amplitude modulated femtosecond laser pulses." Optics letters 39.3 (2014): 540-543.

Li, Hongpu, et al. "Optimization of a continuous phase-only sampling for high channel-count fiber Bragg gratings." Optics Express 14.8 (2006): 3152-3160.

Abdukerim, Nurmemet, et al. "Complex diffraction and dispersion effects in femtosecond laser writing of fiber Bragg gratings using the phase mask technique." Optics Express 27.22 (2019): 32536-32555.

Abdukerim, Nurmemet, et al. "High-temperature stable fiber Bragg gratings with ultrastrong cladding modes written using the phase mask technique and an infrared femtosecond laser." Optics Letters 45.2 (2020): 443-446.

Åslund, Mattias L., et al. "Optical loss mechanisms in femtosecond laser-written point-by-point fibre Bragg gratings." Optics express 16.18 (2008): 14248-14254.

Gamaly, Eugene G., et al. "Laser-matter interaction in the bulk of a transparent solid: Confined microexplosion and void formation." Physical Review B 73.21 (2006): 214101.

Martinez, Amos, et al. "Photoinduced modifications in fiber gratings inscribed directly by infrared femtosecond irradiation." IEEE photonics technology letters 18.21 (2006): 2266-2268.

Shimotsuma, Yasuhiko, et al. "Self-organized nanogratings in glass irradiated by ultrashort light pulses." Physical review letters 91.24 (2003): 247405.

Williams, Robert J., et al. "Optimizing the net reflectivity of point-by-point fiber Bragg gratings: the role of scattering loss." Optics Express 20.12 (2012): 13451-13456.

Qin, Huabao, et al. "Compact linear polarization spectrometer based on radiation mode shaped in-fiber diffraction grating." Optics Letters 44.21 (2019): 5129-5132.

Rahnama, Abdullah, et al. "Ultracompact Lens-Less "Spectrometer in Fiber" Based on Chirped Filament-Array Gratings." Advanced Photonics Research 1.2 (2020): 2000026.

Rahnama, Abdullah, et al. "Highly efficient fiber Bragg grating spectrometer fabricated with violet and near-infrared femtosecond laser pulses and the phase mask technique." Optics Letters 50.3 (2025): 812-815.

Wagener, Jefferson L., et al. "Fiber grating optical spectrum analyzer tap." Integrated Optics and Optical Fibre Communications, 11th International Conference on, and 23rd European Conference on Optical Communications (Conf. Publ. No.: 448). vol. 5. IET, 1997.

U.S. Appl. No. 18/255,148, Low Scattering loss high temperature stable fiber bragg grating sensor based on micropore formation and method for producing same, filed May 31, 2023.

U.S. Appl. No. 19/2217,748, High efficiency optical fiber bragg grating device based on micropore formation and method for producing same, filed May 23, 2025.

* cited by examiner

PHASE-SHIFTED FIBER BRAGG GRATING SENSOR AND METHOD FOR PRODUCING SAME

FIELD OF THE INVENTION

The present invention relates to methods for the formation of T-phase-shifted fiber Bragg gratings in optical waveguides and to sensing apparatus comprising such gratings using femtosecond pulse duration lasers and specialized transmission diffraction elements or phase masks. Such sensors can be used for measurement of pressure, strain, temperature, or displacement or index of refraction. Advantageously said sensors, when fabricated in silica based waveguides, can also be made to have high thermal stability, for example up to 1000° C.

BACKGROUND OF THE INVENTION

Fiber Bragg grating (FBG) sensors are attractive devices for performing quasi-distributed temperature and strain measurements along an optical waveguide (e.g. optical fiber). The grating structure acts as a band-rejection optical filter passing all wavelengths of light not in resonance with it and reflecting those that satisfy the Bragg condition of the core index modulation, namely:

$$A_B = 2n_{eff}A_G \qquad (1)$$

where $A_B$ is the FBG Bragg resonance or Bragg wavelength, $n_{eff}$ is the effective refractive index seen by the guided mode of light propagating down the fiber, and $A_G$ is the period of the index modulation that makes up the grating. Variations in the spectral response of the grating result from period changes in the Bragg grating due to strains or temperature variations that are experienced by the optical fiber when placed in a specific environment. These FBG sensors offer important advantages over other sensor technologies because of their electrically passive operation, electromagnetic interference (EMI) immunity, high sensitivity and multiplexing capabilities. Fiber Bragg gratings are simple, intrinsic sensing elements which traditionally have been photo-inscribed into photosensitive Ge-doped silica fiber using high power UV laser sources. Each FBG sensor has a characteristic retro-reflective Bragg resonance or Bragg resonance wavelength, which is dependent upon the periodicity of the grating photo-inscribed within the fiber and the effective refractive index $n_{eff}$ of the fundamental core mode of the optical fiber. The FBG sensors can then easily be multiplexed in a serial fashion along a length of single fiber to produce a quasi-distributed optical fiber sensor array. When embedded into composite materials, optical fibers with an array of FBG sensors allow for distributed measurements of load, strain, temperature and vibration of the material creating what has is commonly referred to as "smart structures" where the health and integrity of the structure is monitored on a real-time basis.

By introducing a T-phase shift (see the Detailed Description of the Invention) in the periodicity of the grating, in the center along the grating length, a very narrow transmission peak can be produced within the spectral stopband of the Bragg resonance which causes the grating to behave like a Fabry-Perot resonator. Due to this special spectral passband feature, phase-shifted FBGs are widely used in distributed-feedback fiber lasers as taught by Kringlebotn. et al. in U.S. Pat. No. 5,771,251, hereby included as reference. As well phase-shifted FBGs written into passive UV sensitive optical fibers have been used as multiparameter optical sensors as taught by Ronnekleiv at al. in U.S. Pat. No. 6,888,125.

Typically, fiber Bragg gratings are generated by exposing the UV-photosensitive core of a germanium doped silica core optical fiber to a spatially modulated UV laser beam in order to create permanent refractive index changes in the fiber core. Such a spatially modulated UV beam can be created by using a two-beam interference technique as disclosed in U.S. Pat. No. 4,807,950 by Glenn et al. or by using a phase mask as disclosed in U.S. Pat. No. 5,367,588 by Hill et al. The techniques taught by Glenn and Hill result in gratings that are typically referred to as Type I gratings.

Formation of a phase shift in the Bragg grating can be performed by inscribing the grating with a specialized transmission diffraction grating called a phase mask that incorporates the phase shift in the mask pattern as demonstrated by Kashyap et al. in Electronics Letters 30 (21), pg. 1977 (1994). The phase shift in the Bragg grating can also be created by performing a post exposure in the center of a uniform FBG as taught by Canning and Sceats in U.S. Pat. No. 5,830,622 or by precisely displacing a uniform pitched phase mask with respect to the optical waveguide during FBG inscription as taught by Cole et al. in U.S. Pat. No. 6,072,926. A limitation of the phase shifted phase mask approach taught by Kashyap, is the issue phase shift splitting that occurs in the interference pattern used to generate the Bragg grating. Trembley and Sheng showed in article published in the Journal of the Optical Society of America B 23 (8), 1511 (2005) that the phase shift splitting easily results in spectral asymmetry errors and shifting of the transmission passband of phase shifted Bragg grating that are undesirable from a sensing perspective.

A limitation of the prior-art UV-induced Type I phase-shifted fiber Bragg gratings, especially for high temperature sensor applications, is that operation of the sensor at elevated temperatures results in the removal or annealing of the UV-induced color centers and densification which are responsible for the induced index change of the grating. In fact, at temperatures approaching the glass transition temperature of the fiber, which for silica is approximately 1300° C. total removal of the induced index modulation results.

The fabrication of high temperature stable Bragg gratings using infrared ultrafast radiation and a phase mask, as taught by Mihailov et al in U.S. Pat. No. 6,993,221 results in high temperature stable Bragg gratings with very high index modulations ($\Delta n > 10^{-3}$). Phase-shifted FBGs can be fabricated using infrared (IR) femtosecond (fs) lasers. The primary technique that has been demonstrated is based on point-by-point/line-by-line writing, as shown by G. D. Marshall et al. in Optics Express 18(19), 19844-19859 (2010). More recently, adaptation of the technique taught by Cole et al. in U.S. Pat. No. 6,072,926 but applied using an infrared femtosecond source to produce a phase-shifted FBG was shown by Bernier et al Optics Letters 40(1), 81-84 (2015). Similarly adaption of the technique taught by Canning and Sceats in U.S. Pat. No. 5,830,622 but applied using an infrared femtosecond source to produce phase-shifted FBGs was demonstrated by He et al. in Optics Letters 40 (9), 2008-2011 (2015). The techniques of point-by-point exposure or precision uniform phase mask translation require precision translation stages with spatial resolutions in the nanometer range that are often expensive. Post exposure introduces an extra processing step. From a manufacturing perspective it is also difficult to reproduce identical structures using these approaches.

Another important advantage of using a femtosecond laser source is that one is not limited to fabricating Bragg gratings in optical fibers or waveguides that are only photosensitive to UV light, which is typically Germanium doped silica glass. The multiphoton nature of the induced index change process, as taught by Mihailov et al in U.S. Pat. No. 6,993,221, can be applied to any material that is transmissive to the femtosecond radiation, such as for example pure silica glass, or crystalline sapphire.

Recently Du et al. in IEEE Photonics Technology Letters 29(24) 143-146 (2017) demonstrated that a fiber Bragg grating-based Fabry-Perot etalon could be fabricated by blocking the central portion of the fs-laser beam during exposure of a uniform pitched phase mask. Spectrally the Fabry-Perot etalon is similar to that of a phase shifted grating however the bandwidth of the passband feature of the phase shifted grating is narrower and the centralization of the passband within the stop band defined by the etalon is difficult to achieve. As indicated by Wu et al in Optics Express 20 (27), 28353-28356 (2012), optimization of a phase shifted grating as a sensor, relies on maximizing the amplitude of the transmission of the passband with respect to the transmission of the stopband and on the steepness (bandwidth) of the passband. This occurs when the passband is centralized within the stopband producing a symmetric spectral response.

When a single phase-shifted FBG structure is written into an actively doped optical fiber such as an erbium doped optical fiber, a distributed feedback laser (DFB) is formed as first demonstrated by Loh and Laming in Electron. Lett. 31(17), 1440 (1995). Similarly a dual Bragg grating laser forming a distributed Bragg reflector fiber laser (DBR) is also possible. An advantage of applying the IR femtosecond laser/phase mask inscription method is that DFB fiber lasers are not limited to UV-photosensitive active fibers but can be fabricated in any actively doped waveguide substrate that is transparent to the IR radiation. Recently Bernier ct al Optics Letters 40(1), 81-84 (2015) demonstrated a DFB fiber laser in Holmium doped ZBLAN fluoride glass fibers where the Bragg grating was written by scanning femtosecond IR radiation along a uniform phase mask that was precision translated half way through the scanned. The method presented here by the inventors could reproducibly fabricate similar DFB fiber lasers without the need of expensive precision translation equipment.

There still remains in this field of art the need for phase shifted fiber Bragg grating sensors that can be made in non-UV photosensitive fibers, are thermally stable, and can be easily manufactured to have a symmetric spectral response and narrow bandwidth passband.

SUMMARY OF THE INVENTION

In one aspect, there is provided a method for inscribing a phase shifted Bragg grating in an optical waveguide, comprising the steps of: providing the optical waveguide; providing electromagnetic radiation from an ultrashort pulse duration laser, wherein the electromagnetic radiation has a pulse duration of less than or equal to 5 picoseconds, and wherein the wavelength of the electromagnetic radiation has a characteristic wavelength in the wavelength range from 150 nm to 2.0 microns; providing a diffractive optical element which incorporates a phase shift that when exposed to the ultrashort laser pulse, creates an interference pattern on the optical waveguide which has a phase shift in its pattern, wherein the irradiation step comprises irradiating a surface of the diffractive optical element with the electromagnetic radiation, the electromagnetic radiation incident on the optical waveguide, from the diffractive optical element, being sufficiently intense to cause the permanent change in index of refraction in the core of the optical waveguide. In one embodiment, the method further comprises a step of introducing a beam block to remove the effect of phase-shift splitting observed in grating structures written using phase shifted phase masks; irradiating the optical waveguide with the electromagnetic radiation to form a Bragg grating, the electromagnetic radiation incident on the optical waveguide being sufficiently intense to cause a permanent change in an index of refraction within a core of the optical waveguide when exposed to a succession of laser pulses.

In another aspect, there is provided an optical waveguide with an inscribed Bragg grating prepared according to the method as described herein.

In still another aspect, there is provided an optical waveguide with an inscribed Bragg grating, wherein: the Bragg grating is stable at a temperature up to the glass transition temperature of the optical waveguide;

In the present application, references to "a permanent change in an index of refraction within a core of the optical waveguide" represents the formation of a grating that is stable at higher temperatures, for example at a temperature up to just below the glass transition temperature of the material forming the optical waveguide being inscribed with the grating. This is also referred to herein and in the art as a type II grating. In one embodiment, where the waveguide is a silica based fiber, a permanent change in an index of refraction within a core of the optical waveguide is one which is stable at temperatures of up to 1000° C. In other embodiments, where the optical waveguide comprises a different material (e.g. crystalline sapphire), the temperature may be higher than 1000° C.

In the present application, references to a "non-permanent grating" refer to gratings that are not stable to high temperatures, and that can be substantially removed by heating the optical waveguide. These are also referred to herein and in this field of art as type I gratings. In one embodiment, a non-permanent grating is one which is substantially removed by heating at temperatures of up to 1000° C. In some embodiments, the non-permanent gratings are substantially erased at temperatures lower than 1000° C., for example 800° C.

DETAILED DESCRIPTION OF THE INVENTION

Figure 1A:
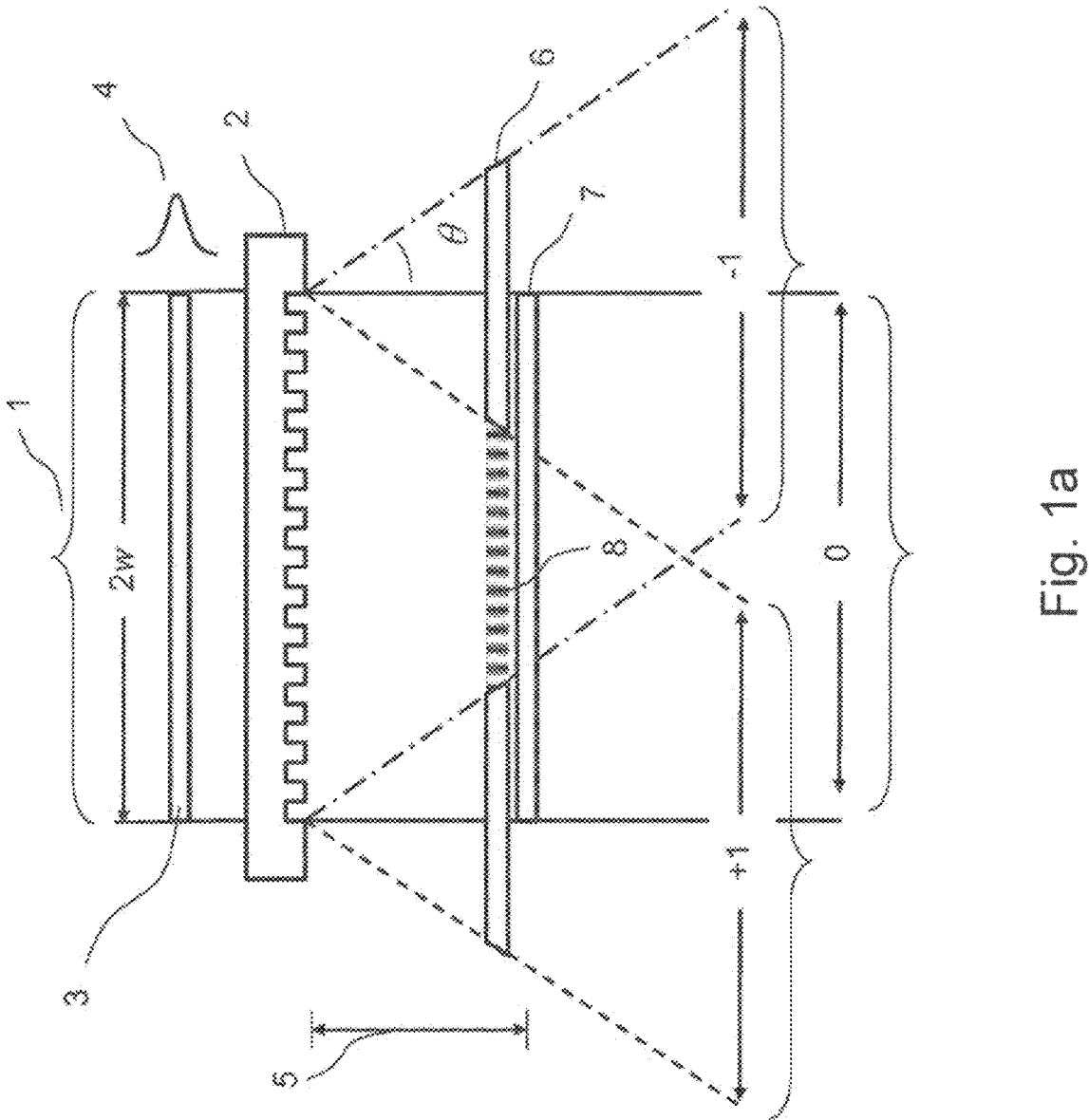
FIG. 1a depicts the order walk off effect from a uniform phase mask of diffracted femtosecond pulses.
Figure 1B:
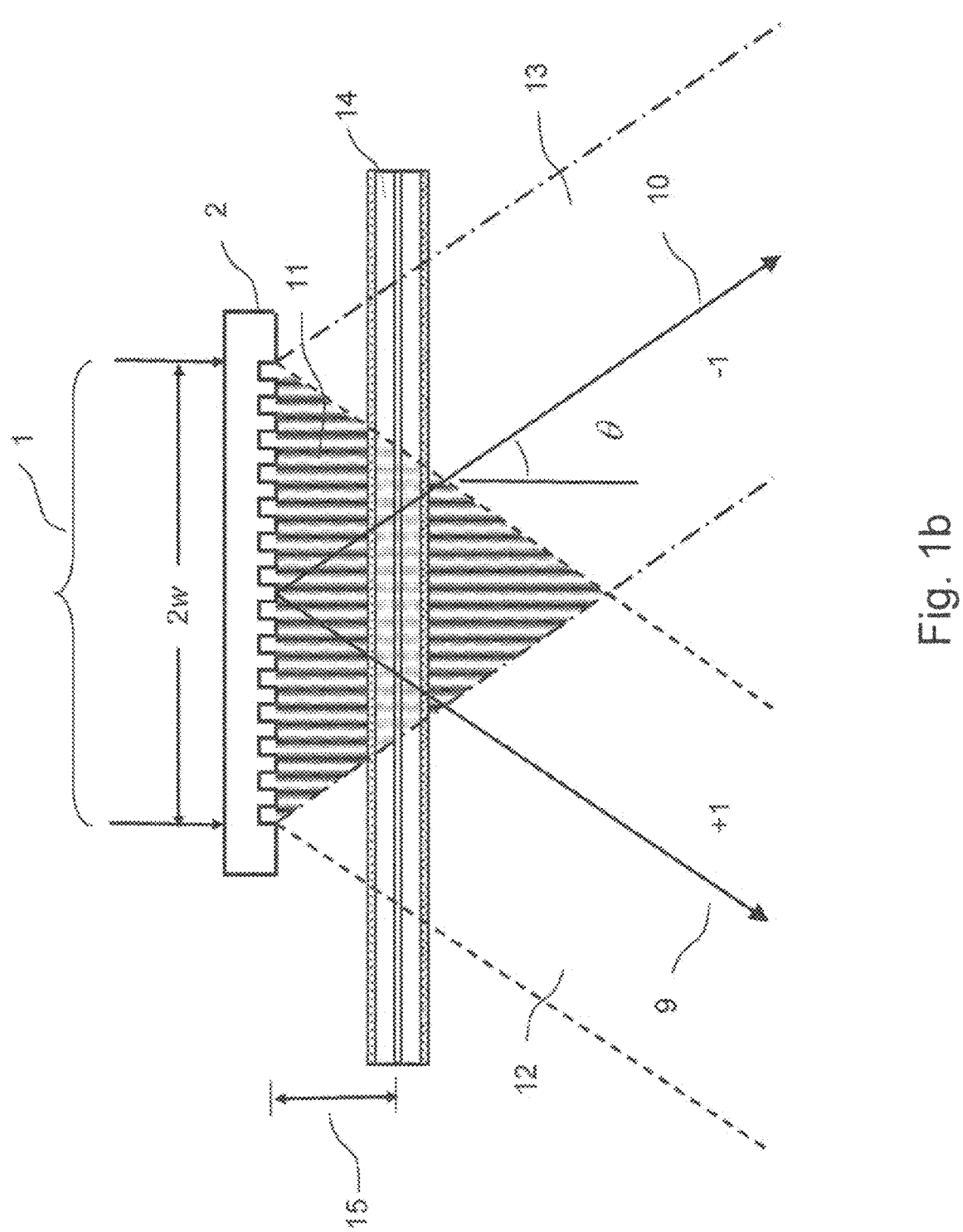
FIG. 1b depicts the idealized case of the spatially generated interference pattern produced by the overlap of the +1 and −1 orders of the diffracted femtosecond beams from a uniform pitched phase mask.

It is an object of this invention to provide for fabrication of high temperature stable phase shifted FBG sensors. As taught by Mihailov et al. in U.S. Pat. No. 7,031,571, femtosecond pulses interact differently with a transmission diffraction grating or phase mask when compared to continuous wave (CW) UV sources. In FIG. 1 a), the incident femtosecond beam 1 with a width 2w, impinges on a uniformly pitched phase mask 2 at normal incidence. The femtosecond beam 1 is composed of a number of femtosecond light pulses 3 which have a spatial dimension or pulse envelope of the electromagnetic radiation 4 which is dependent on the pulse duration. For example a 100 femtosecond pulse has a width of its electromagnetic pulse envelope in the direction of the beam propagation that is 30 μm wide. On passing through the phase mask, the femtosecond beam 1 is split into a number of beams that is dependent upon the periodicity A of the corrugation structure of the mask and the wavelength A of the femtosecond beam such that:

$$8 = \sin^{-1}\left(\frac{mA}{A}\right) \qquad (2)$$

where m is the order number of the diffracted beam. For example, a phase mask that has a nominal periodicity of 1.071 μm when irradiated with 800 nm infrared radiation at normal incidence will produce 3 femtosecond beams related to the diffracted orders of the mask, namely a 0 order that is in line with the incident beam and +1 and −1 orders that diffract with angles 8~±48° with respect to the normal to the mask. By optimizing the depth of the troughs of the corrugation pattern of the mask with respect to the wavelength of the irradiating beam, coupling of the incident beam energy into the ±1 orders can be maximized. At the phase mask surface, the generated pulses in each of the diffracted orders overlap spatially. The pulses propagate away from the surface at the speed of light along the beam path defined by the diffracted order. At a given distance 5 from the phase mask, the projection of the propagating ±1 orders 6 on to the normal of the mask no longer overlap with the 0 order 7. Only the portions of the ±1 orders that overlap interfere resulting in a sinusoidal interference pattern 8. This is the order walk-off effect taught by Mihailov in U.S. Pat. No. 7,031,571. For the example of the 1.071 μm pitched phase mask irradiated with 100 femtosecond pulse duration 800 nm infrared radiation, the walk-off distance 5 is ~90 μm from the mask surface. Interference patterns produced with fs-pulses and a uniform phase mask are well-studied both theoretically and experimentally. In FIG. 1b) consider an ideal situation when the mask 2 splits the incident light only into +1 and −1 diffraction orders 9 and 10 respectively. A pure two-beam interference pattern is then formed in region 11, whereas the intensity distribution is fringeless in regions 12 and 13. It can also be seen that the intensity distribution at the fiber 14 will be strongly affected by both the effective width 2w of the fs-beam at 2 (e.g., the diameter at the $1/e^2$ intensity level for a fs-beam with a Gaussian intensity profile) and the mask-to-fiber distance 15.

Now we consider a uniform phase mask containing a phase-shift. The introduction of a single phase-shift into a uniform phase mask can be thought of as cutting it into two (equal) sections and then either i) inserting an additional section of length o between the two sections or ii) removing material of length o between the two sections and then stitching them together. A 'T-phase-shifted mask' is defined as a uniform phase mask one half of which is shifted with respect to the other by 5/4 of the mask period $A_M$, i.e., $o=A_M/4$. The 'T-shift' terminology originates from the fact that a phase shift with $o=A_M/4$ in the middle of a uniform phase mask causes a phase-shift of $2\pi\delta/(A_M/2)=\pi$ in the resultant FBG, whose period $A_G$ is $A_M/2$ by definition.

Figure 1C:
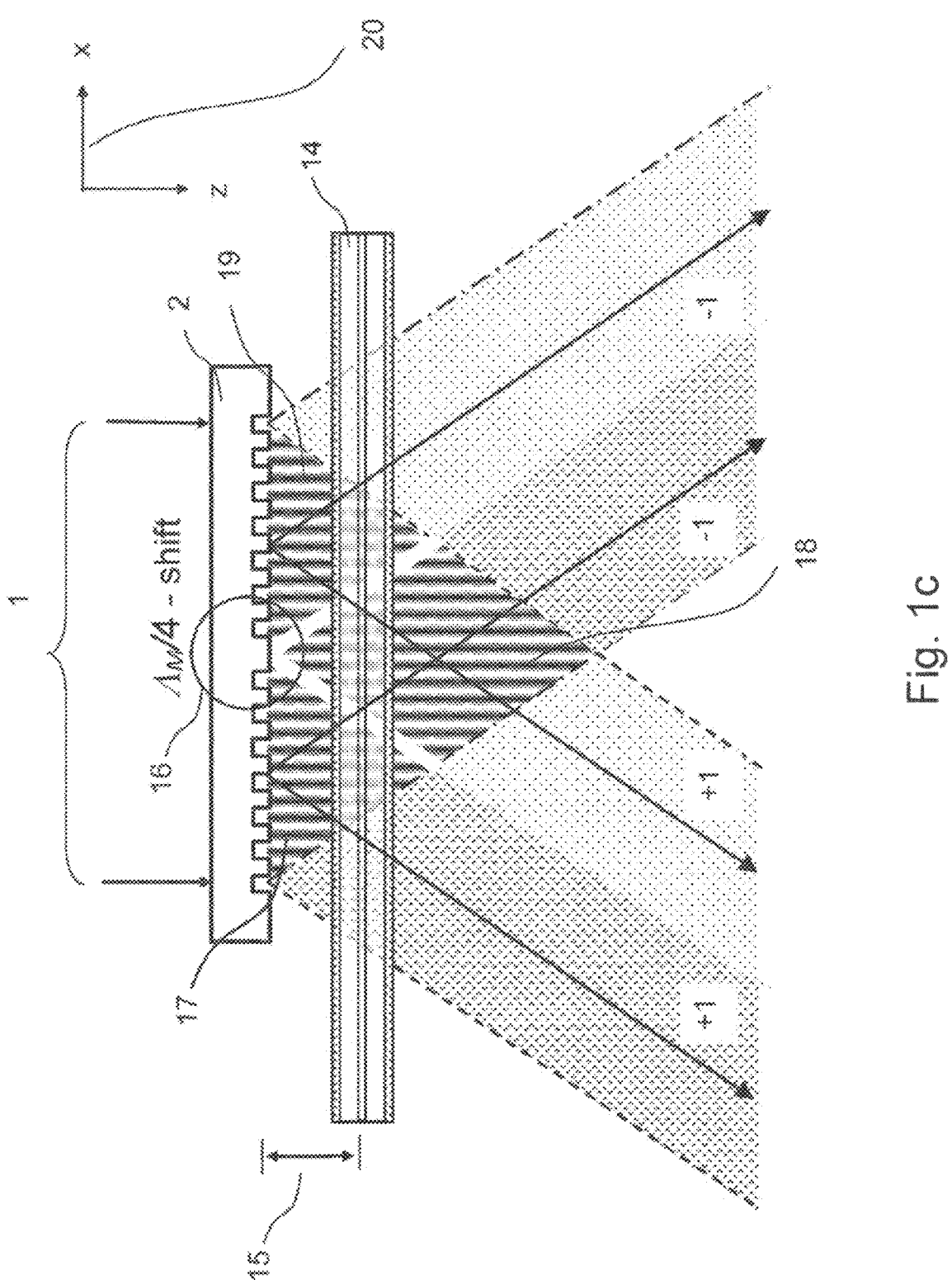
FIG. 1c depicts the complex interference field produced by the diffracted beams resulting from a uniform pitched phase mask with a $A_M/4$ phase shift (i.e., 'T-phase-shifted' phase mask, see the text) introduced in the centre of its periodic structure.

In FIG. 1c) a T-phase step 16 is introduced into corrugation pattern of the mask 2. The interference pattern produced after the mask becomes more complicated compared with the one presented in FIG. 1(b). The +1 diffraction order of 2 to the right of the phase shift 16 (denoted by dots) and the −1 diffraction order of 2 to the left of the phase shift (denoted by divots) can now generate an additional interference fringe system within region 11 of FIG. 1b), which divides it into three sub-regions 17, 18, and 19. The interference fringes within sub-region 18 are shifted with respect to the fringes in the left and right triangular sub-regions by T/2, i.e., by a quarter of the fringe period. The boundaries of the sub-regions are defined by the mask 2 and the diffraction angle 8. When the fiber 14 intercepts all of the three sub-regions 17, 18 and 19, the light-imprinted structure inside it will consist of three grating sections with a T/2-shift between the adjacent sections. The length of the central section overlapping 18 and each of the two side sections overlapping 17 and 19 respectively, can be approximated by 2L tan (8) and w−2L tan (8), respectively, provided that the fiber 14 is aligned along the x-axis 20, where L is the distance between the mask and the fiber core 15.

Figure 2:
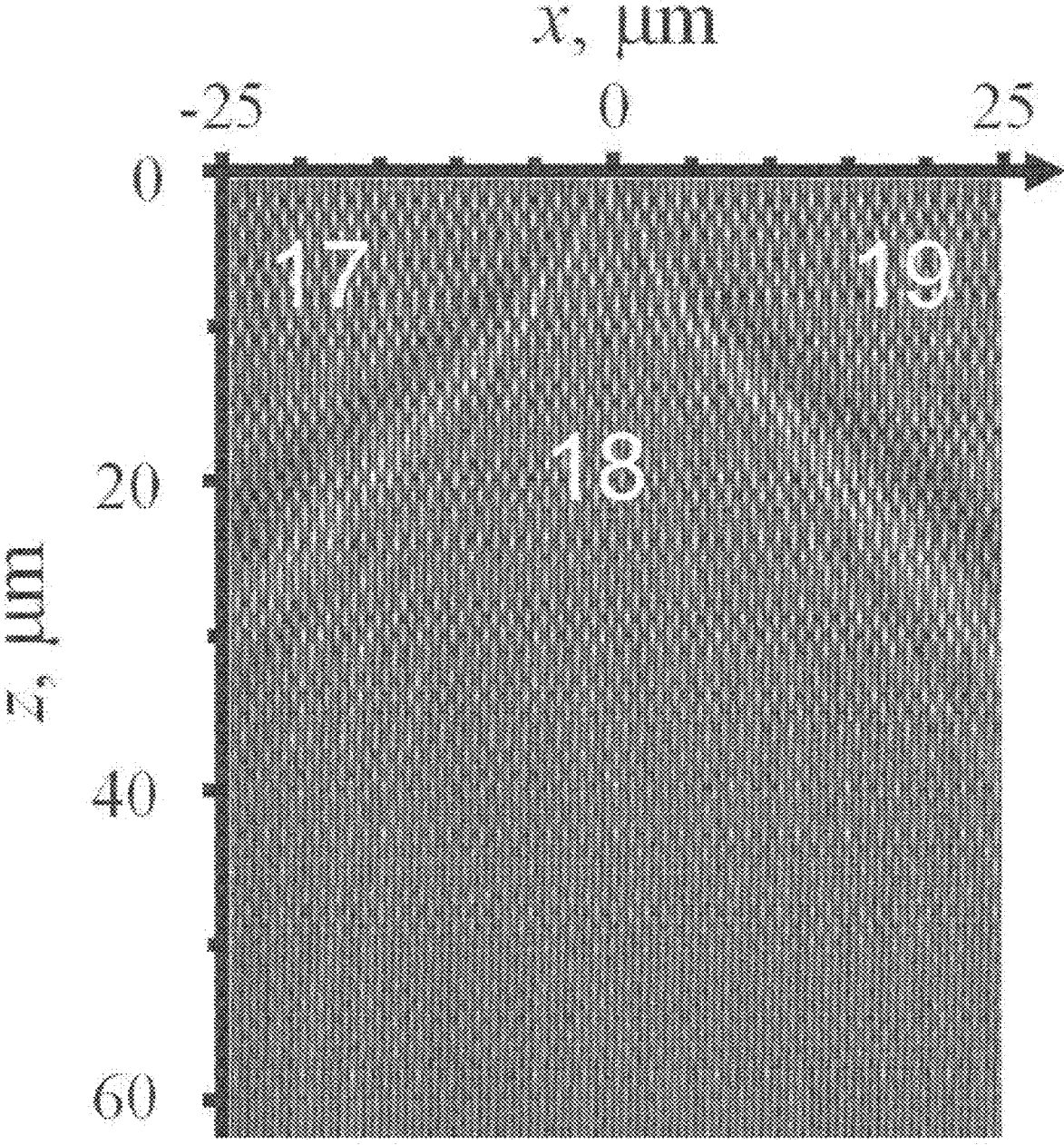
FIG. 2 depicts the measured interference field produced by a 1.07 μm pitched phase mask with a $A_M/4$ phase shift introduced in the centre of its periodic structure.

FIG. 2 presents the measured xz-intensity distribution (axes 20 of FIG. 1c) of the femtosecond pulses after a T-phase-shifted phase mask with a 1.07 μm pitch. The phase mask surface occurs at z=0. FIG. 2 presents the intensity distribution in the vicinity of the T-shift at x=0. To produce the images, the respective xy-intensity distributions with a 1 μm separation along the z-axis were projected onto a CMOS matrix by means of a high numerical aperture (i.e., NA=0.9) objective lens, recorded and combined into 3D stacks as taught by Hnatovsky et al. in Optics Express 25 (13), 14247 (2017). The values of points with fixed $(x_i, z_i)$ coordinates were then averaged along the y-axis and the respective mean values projected onto the xz-plane in order to minimize the ~10-times difference in brightness between the intrafocal and out-of-focus regions along the z-axis. The three sub-regions 17, 18 and 19 denoted in FIG. 1 c) are similarly labeled in FIG. 2. The most salient feature of the intensity distribution in FIG. 2 is the pronounced V-shaped region whose apex coincides with the T-shift. The angle at the apex is estimated at 90-95°. This value is close to twice the diffraction angle $\theta=\sin^{-1}(\lambda/d)$ corresponding to $\lambda$=800 nm and d=1.07 $\mu$m, as predicted by Sheng et al. in Optics Express 13 (16), 6111 (2005). The clear Talbot interference pattern observed in FIG. 2, especially at z<50 $\mu$m, is caused by the presence of the $0^{th}$ diffraction order shown in FIG. 1a, which was neglected in the discussion regarding FIG. 1 b), and c). In reality, the $0^{th}$ order always contains a certain portion of the incident laser power, albeit it can be as low as 1% for state-of-the-art holographic masks. As a consequence, the contrast of the Talbot pattern generated by a $1^{st}$-order mask depends on the ratio of laser powers diffracted into the $1^{st}$ and $0^{th}$ order and the longitudinal walk-off of the orders. This power ratio can be varied within a broad range by selecting the mask design, but for a given design it will also be affected by the pulse polarization. The image in FIG. 2 was obtained using the pulse polarization of the ultrafast beam aligned along the x-axis.

The presence of the central section 18 causes an asymmetry in the FBG spectra. The passband features in the spectra are shifted to shorter wavelengths from the center of the stopband. A detailed analysis of why the T-features in the spectra are shifted to shorter wavelengths is provided by Tremblay and Sheng in the J. Opt. Soc. Am. B 23(8), 1511 (2006).

Figure 3:
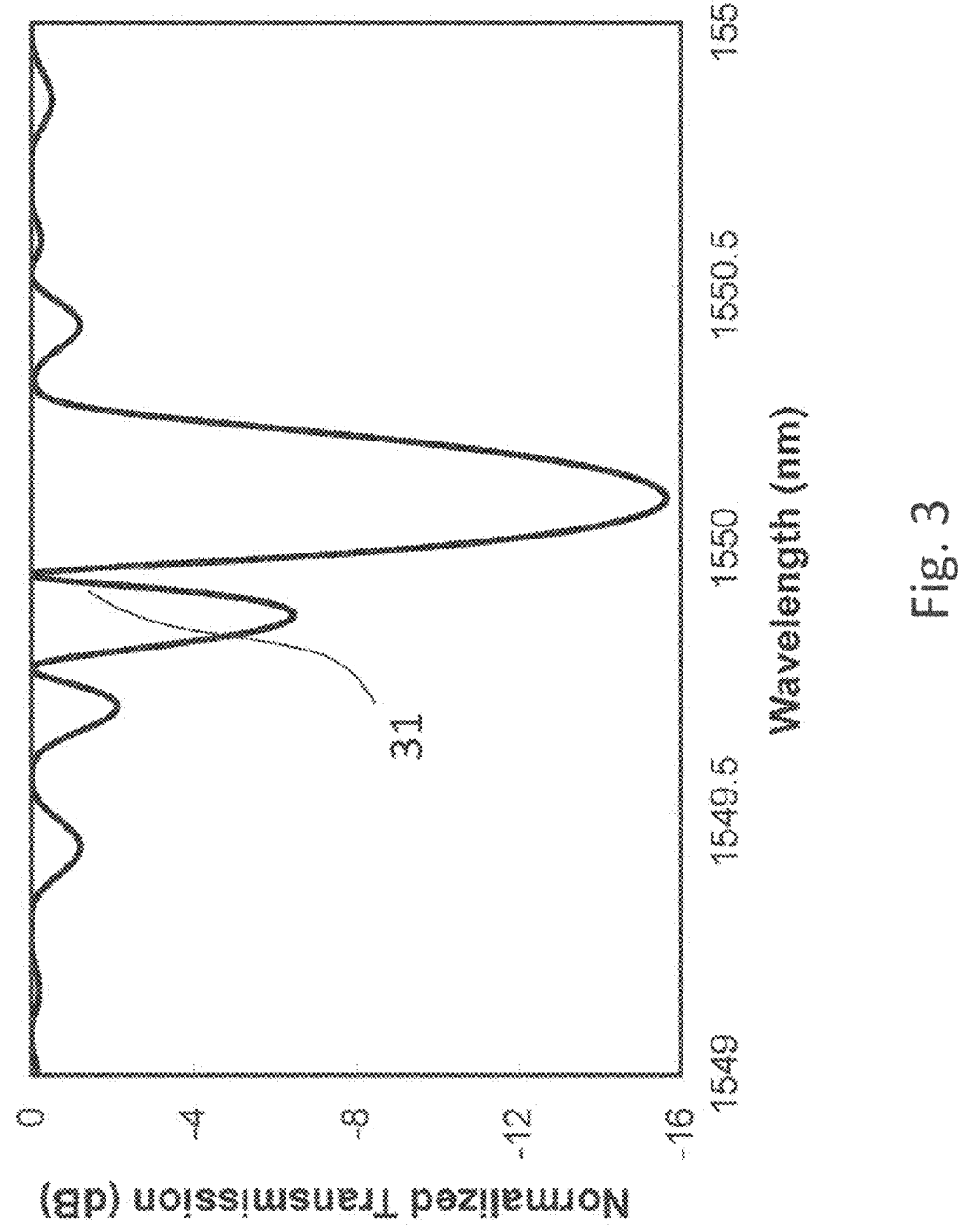
FIG. 3 presents a modeled asymmetric spectrum of a phase shifted Bragg grating written without the inventive correction.

Using this approach, FIG. 3 presents a modeled spectral response for the case depicted in FIG. 1 c) where L (15)=0.5 mm, and the length of sections 17, 18 and 19 are 2.4 mm, 1.1 mm and 2.4 mm respectively. The mask pitch $A_M$ is 1.07 $\mu$m, the effective refractive index of the fiber core $n_{eff}$ is =1.447, the light-induced refractive index modulation in the core $\Lambda n$ is $5\,\xi\,10^{-4}$. The passband peak in the spectrum, 31, is shifted to shorter wavelengths from the center of the stopband. This produces an asymmetric spectral response where the stopband lobes on either side of the passband are unequal in transmissivity, which is undesirable for phase shifted grating sensor.

The inventors have found that for the 3 sub-gratings written by regions 17, 18 and 19 of FIG. 1 c), the amplitude of the wavelength shift of the passband to shorter wavelengths is dependent upon the length of the central grating created by 18 hence the fiber-phase mask distance 15. To reduce the passband shift to lower wavelengths, the contribution of the central grating can be minimized. This can be accomplished by making the central grating short relative to the side gratings, which can be achieved, for instance, by expanding the beam along the fiber to increase 2w, minimizing L. and using a higher order phase mask (e.g., a $3^{rd}$-order mask instead of a $1^{st}$-order mask) to decrease $\theta$. However, it is not easy to make L small and avoid the use of a 1'-order mask under certain conditions. For example, to fabricate FBGs through the protective polymer coating of the fiber, it is physically impossible to reduce the distance between the fiber core and phase mask to less than ~100 $\mu$m (the diameter of standard telecom fibers coated with polyimide and acrylate are ~150 $\mu$m and ~250 $\mu$m, respectively). Moreover, in order to protect the mask from a mechanical contact with the fiber it is desirable that the distance between the coated fiber surface and the mask be more than 100 $\mu$m, which would make L greater than 200 $\mu$m. Additionally, $1^{st}$-order masks, which have large first order diffraction angles $\theta$s, are generally preferred in order to produce a pitch consistent with the fundamental Bragg resonance within the fiber.

Figure 4:
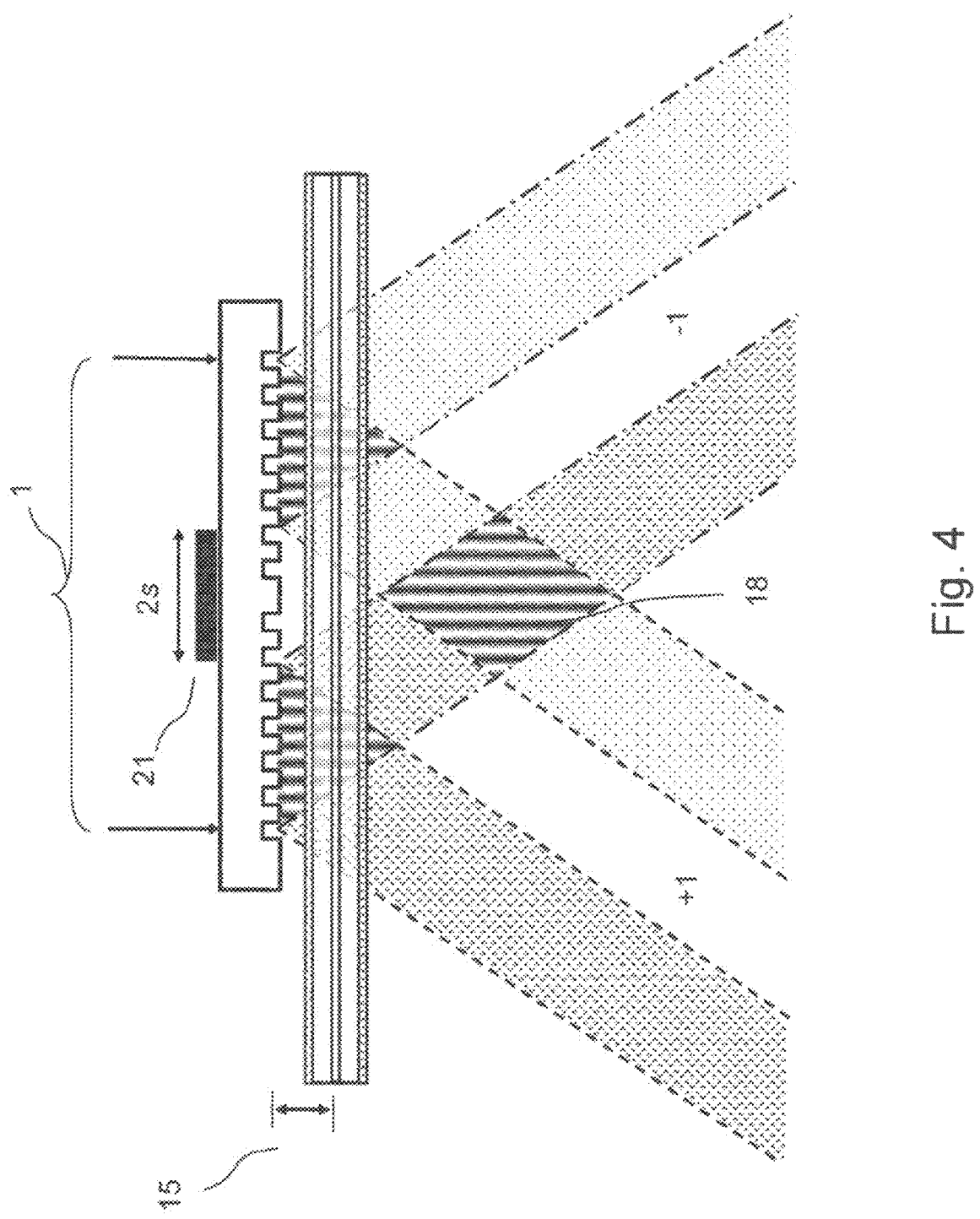
FIG. 4 depicts the complex interference field produced when the phase shift of the mask is blocked.
Figure 5:
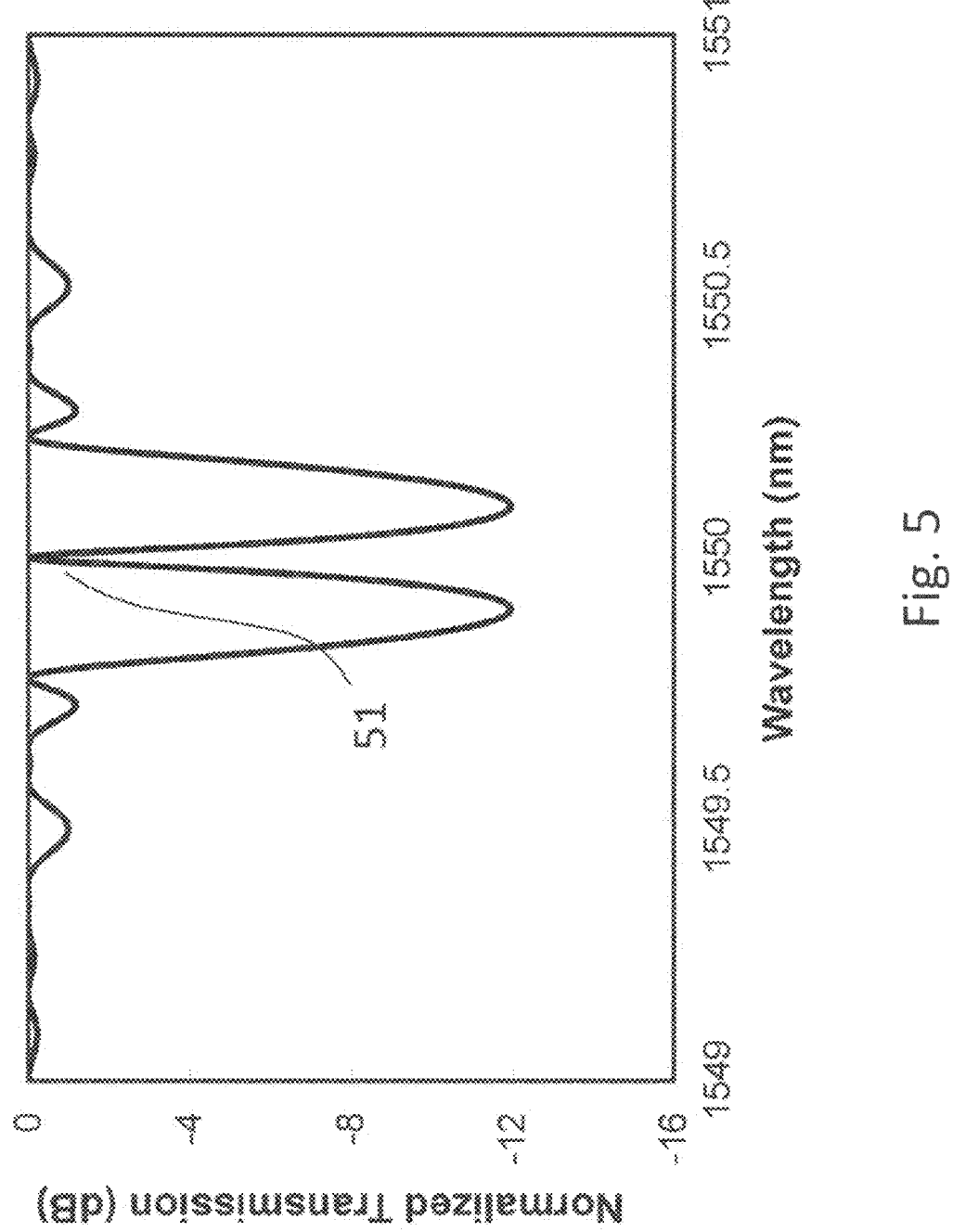
FIG. 5 depicts the modeled spectral response of the grating written in the geometry of FIG. 4 where the Fabry- Perot cavity comprises two gratings in the fiber of arbitrary interstitial distance but with the second grating periodicity T degrees out of phase with the periodicity of the first grating.

FIG. 4 presents an embodiment of the inventive method where the central sub-grating is removed. The central part of the fs-beam can be obscured by a rectangular stop 21 of width 2s, as shown in FIG. 4. In this case, the additional interference fringe system due to the sub-region 18 of FIG. 1c) can be moved away from the mask. A phase-shifted Fabry-Pérot interferometer composed of two detached Bragg gratings can then be inscribed into the fiber by choosing a proper mask-to-fiber distance L (15). The resulting two Bragg gratings will always be T-shifted with respect to each other because they are produced by interference patterns that are T-shifted by definition (the fringes are 'affixed' to the mask). It can be shown using numerical simulations that such a fiber interferometer will spectrally resemble a standard T-shifted FBG if the separation between the two constituting FBGs, which is given by 2(s+L tan (8)), remains smaller than their length, which is respectively given by w–s–2L tan (8). FIG. 5 presents a simulated spectrum of the phase-shifted Fabry-Pérot interferometer where the mask pitch d is 1.07 $\mu$m, the effective refractive index of the fiber core $n_{eff}$ is =1.447, the light-induced refractive index modulation in the core $\Lambda n$ is $5\,\xi\,10^{-4}$. The passband 51 is centered within the stopband. The mask-to-fiber distance L (15) of FIG. 3 is 0.25 mm and 2s=1 mm. The beam width 1 used for the simulation in FIG. 3 is 7 mm in width (i.e., 2w) and is a quasi-flat-top.

Strictly speaking, for the above consideration to be valid, one has to assume that neat is not affected by the inscription process. In reality, $n_{eff}$ in the laser-irradiated regions and the unexposed portions of the fiber is different, which also causes an asymmetry in the FBG spectrum. If $n_{eff}$ in the irradiated regions is higher/lower than that in the unexposed fiber core, the passband feature moves towards shorter/longer wavelengths within the FBG spectrum.

Figure 6:
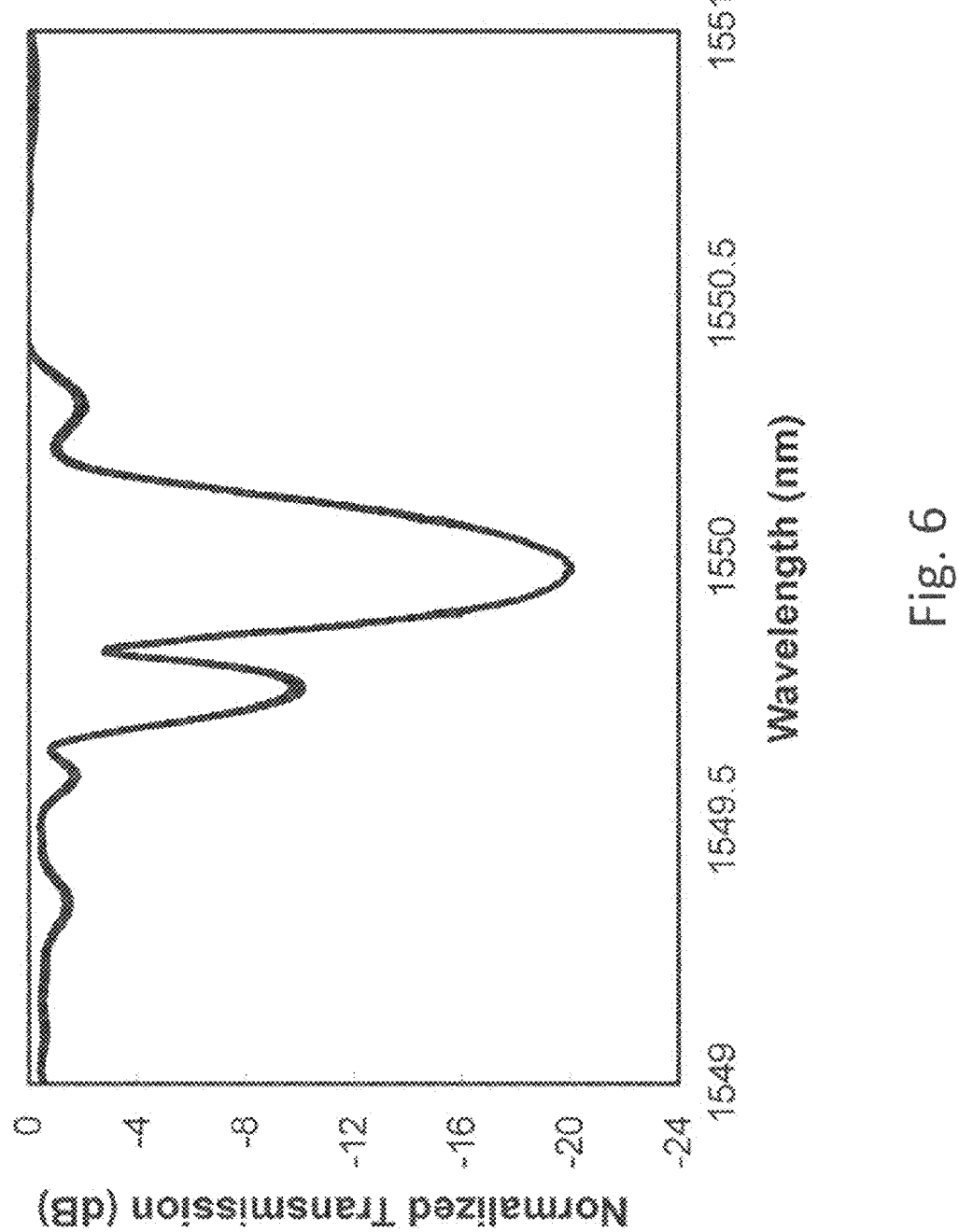
FIG. 6 is the measured spectrum of a fiber Bragg grating written with a T-phase-shifted phase mask.
Figure 7:
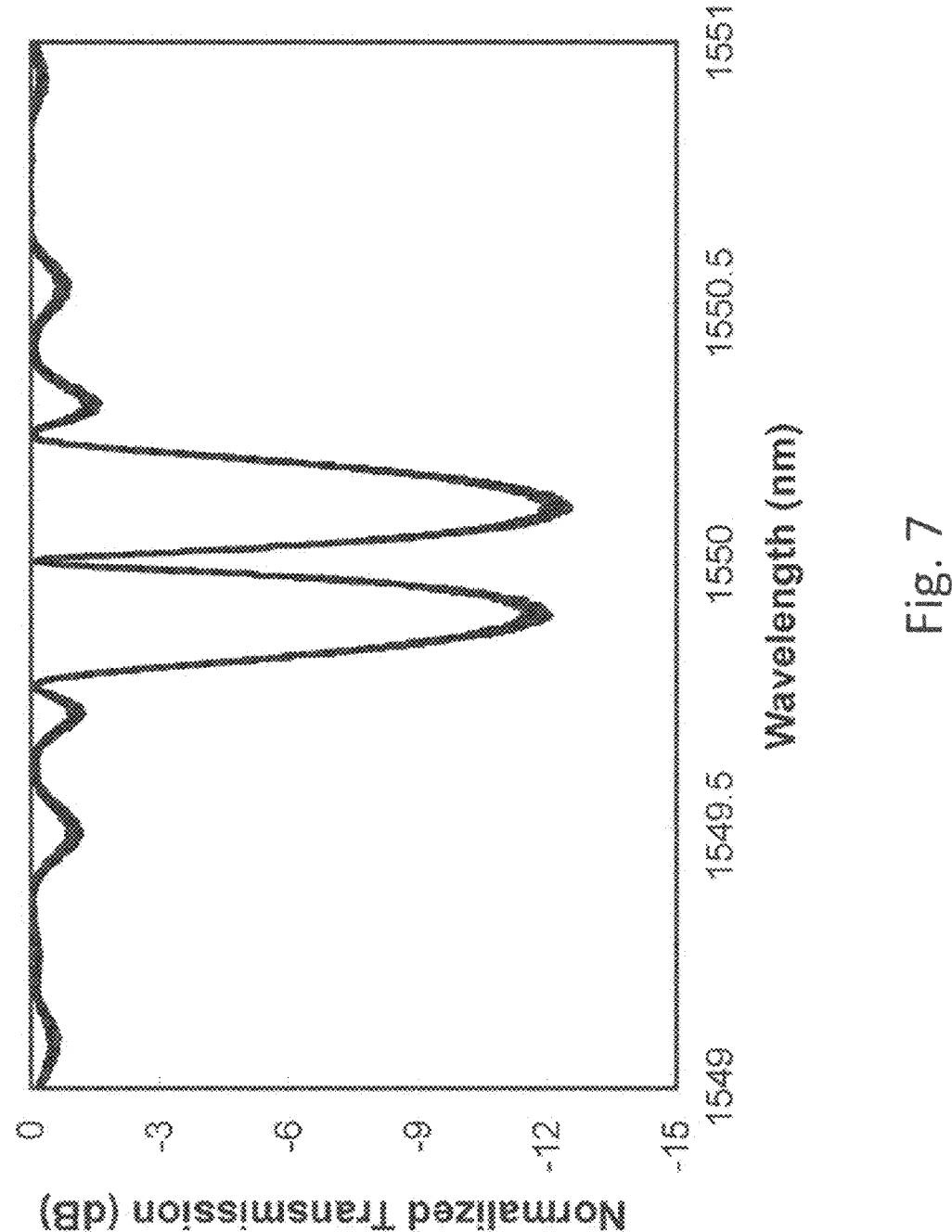
FIG. 7 is the measured spectrum of a fiber Bragg grating written with a T-phase-shifted phase mask identical to the result in FIG. 6 but with phase-shifted region blocked.

FIG. 6 and FIG. 7 present spectral responses of phase shifted FBGs that are made with a T-phase-shifted phase mask without and with the invented method to correct for the asymmetry in the grating spectrum. The mask pitch $A_M$ is 1.07 $\mu$m. The spectrum in FIG. 6 is of an FBG written at L~450 $\mu$m when the fiber core was exposed to a complex interference pattern consisting of three regions (as given in the description for FIG. 1(c)). The spectrum in FIG. 7 is of an FBG written at L~450 $\mu$m when the T-shift is blocked by a stop 21 (FIG. 4) with 2s~1 mm (as given in the description for FIG. 4). The FBG in FIG. 7 becomes a T-shifted Fabry-Perot interferometer composed of two detached uniform Bragg gratings. The laser parameters used to fabricate the gratings for FIGS. 6 and 7 are the same. The spectra were recorded using a tunable laser source with a 1 pm resolution We note that, in principle, the above 'beam-stop technique' may also be used with standard uniform masks to produce a phase-shifted Fabry-Pérot interferometer if the unexposed region at the fiber core happens to introduce the correct phase shift between the two detached Bragg gratings. Taking into account that in this case the phase shift critically depends on the length of the unexposed region, the latter has to be somehow adjusted to a fraction of a micrometer to produce a symmetric spectrum.

In another embodiment of the invention, the induced index change of the phase-shifted grating structure can be in the form of the well-known self-organized nanostructures (nanograting) as described by Taylor et al. in U.S. Pat. No. 7,033,519. Hnatovsky et al. demonstrated in Optic Letters 42 (3), 399 (2017) that nanogratings were found in Type II Bragg gratings produced in standard telecommunication germanium-doped silica optical fiber by side-illuminating it with multiple linearly polarized IR fs-laser pulses through a phase mask. Beresna et al. showed in Optical Materials Express 1 (4), 783 (2011) that the planar nanostructures, which are often referred to as nanogratings, are aligned perpendicular to the laser polarization and exhibit strong form birefringence. Form birefringence is observed in a periodically layered medium when the spacing between the layers is small compared with the wavelength of light. In this case the medium behaves as an optically uniaxial crystal whose optical axis is oriented perpendicular to the layers. The refractive index difference between the ordinary and extraordinary rays in fs-laser-induced nanostructures can be as high as $5 \xi 10^{-3}$.

The spectral characteristics of a phase-shifted Bragg grating whose planes contain nanostructures will therefore depend on how the nanostructures are oriented with respect to the fiber. When the planar nanostructures are at an angle with respect to the axis of the fiber core, the FBG can be thought of as a (multiple-order) wave plate in terms of its birefringent properties. On the other hand, when the planar nanostructures are aligned exactly perpendicular to the axis of the fiber core, the optical axis of the uniaxial crystal associated with them will be aligned parallel to the fiber core and the FBG spectrum is expected to be insensitive to the polarization state of the light propagating through it, provided that the birefringence of the fiber is caused only by the nanostructures. Thus, in order to avoid or minimize the polarization dependence of the FBG spectrum, the polarization of the fs-laser pulses should be aligned parallel to the fiber axis. Conversely, in order to maximize the birefringence of the phase-shifted Type II FBGs, which is desirable for multi-parameter sensing applications, the fs-laser polarization should be aligned perpendicular to the fiber.

Figure 8:
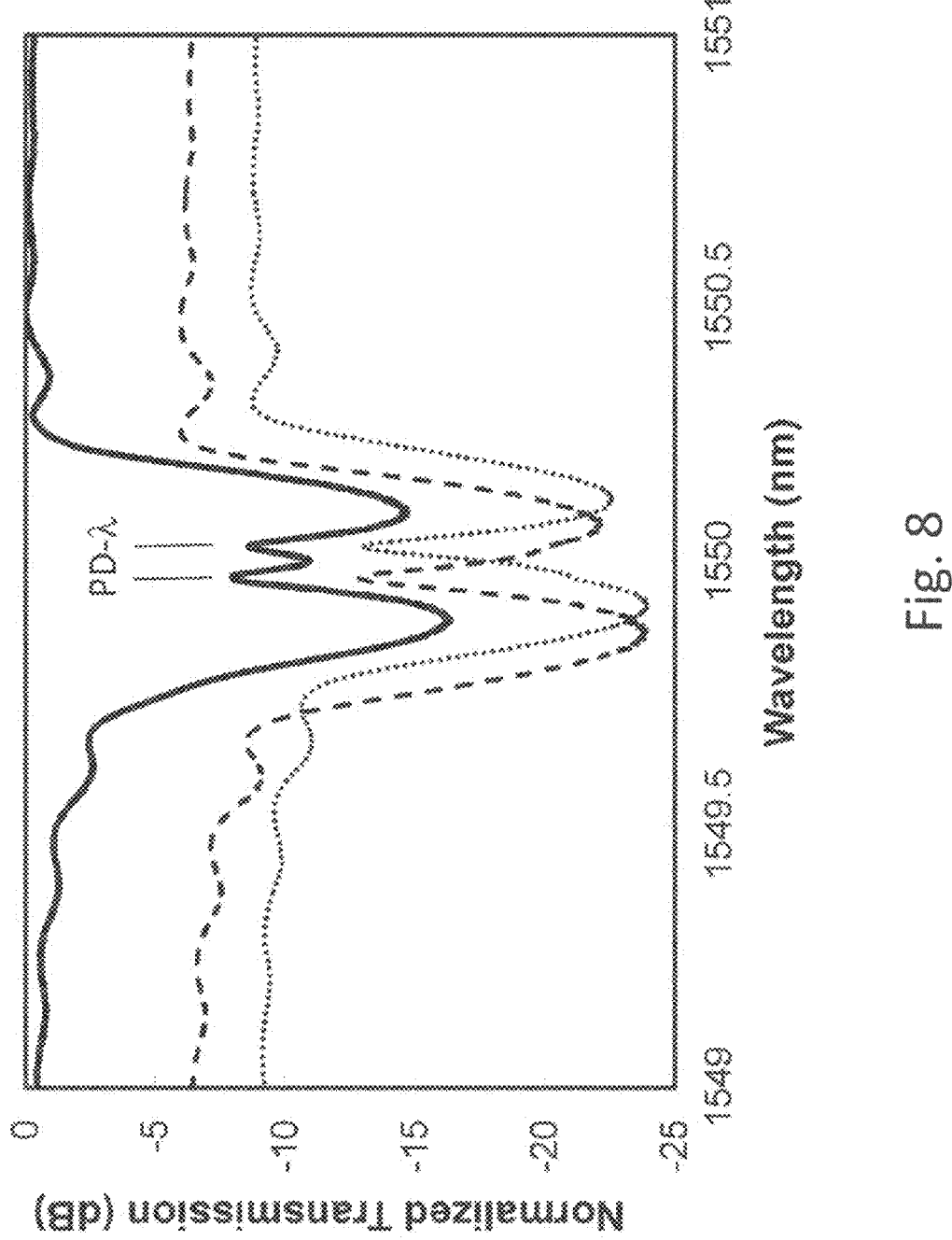
FIG. 8 is the spectral response of a phase shifted grating written using the inventive method where the birefringence is maximized by inscribing the grating with the femtosecond beam polarization normal to the fiber axis.

FIG. 8 presents spectra of a type II phase shifted Bragg grating written using the disclosed method where the polarization of the fs writing beam is aligned perpendicular to the fiber axis (y-axis). In this case, the polarization-dependent difference in the central wavelength (PD-A) of the passband feature is almost 70 μm. The three traces in FIG. 8 correspond to different states of the probe light polarization (i.e., $p_s$, $p_f$ and $p_{45}$), which were prepared by means of an in-line polarization controller. The dashed and dotted traces represent the situations when the probe light is linearly polarized and the polarization is aligned along the slow axis ($p_s$; 'large' $n_{eff}$) and the fast axis (pr, 'small' $n_{eff}$) of the FBG, respectively. The solid trace represents the case when the linear polarization is at 450 with respect to the axes (i.e., $p_{45}$).

Figure 9:
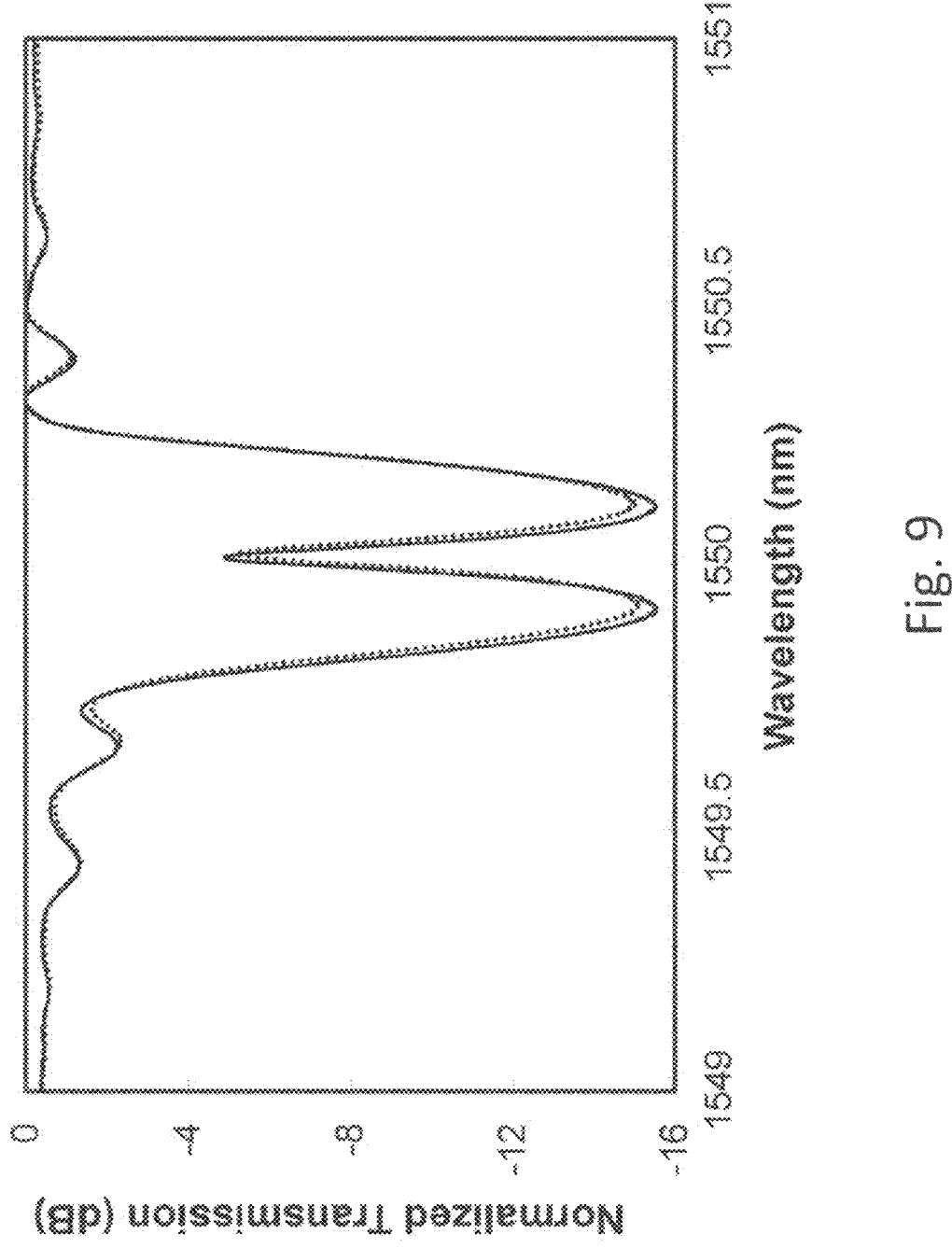
FIG. 9 is the spectral response of a phase shifted grating written using the inventive method where the birefringence is minimized by inscribing the grating with the femtosecond beam polarization parallel to the fiber axis.
Figure 10:
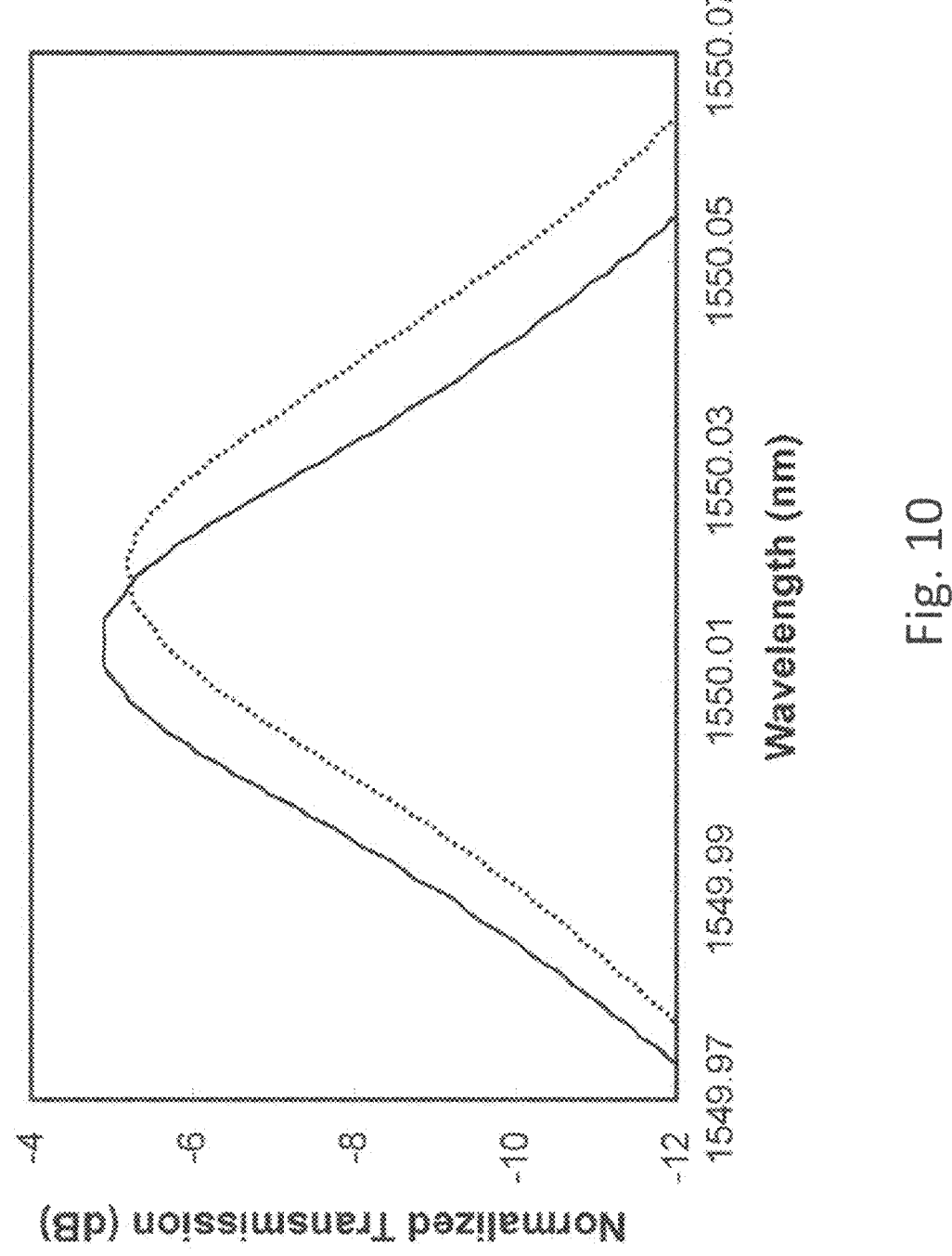
FIG. 10 is an expanded view of the passband peak presented in FIG. 9.

On the other hand, the FBG written with the femtosecond beam polarization oriented in the x-direction along the fiber axis, as shown in FIG. 9, demonstrates almost an order of magnitude reduction in the PD-A, with all other laser writing conditions being the same in both cases. Stress induced by the Type II modification in the fiber core is the most likely cause of this relatively large PD-A (i.e., 7-8 pm as shown in FIG. 10). Importantly, the PD-A of 10-15 dB T-shifted Type I FBGs is found to be much smaller, at the level of 1-2 μm for x-polarization and 3-5 μm for y-polarization. These results suggest that the observed polarization sensitivity of the Type II FBG spectra (i.e., PD-A) is predominantly caused by the presence of light-induced planar nanostructures (or nanogratings), which inside dielectrics are aligned perpendicular to the laser polarization and exhibit strong form birefringence.

To test how T-shifted Type II FBGs respond to high-temperature annealing, several devices having different strengths were fabricated (3-30 dB in transmission). For a fixed pulse energy, grating strength increases with the number of pulses deposited into the fiber core. The devices were then temperature-cycled 20 times inside a tube furnace from 20° C. to 1000° C. in ambient air. During this testing, the FBGs stayed in the furnace at 1000° C. for more than 200 hours. We observed that the phase-shift features of all the FBGs tested shifted towards longer wavelength by 150-250 μm. However, this noticeable shift mainly occurred only in the first 30-50 cumulative hours of annealing at 1000° C. and almost no shift could be detected during the later stages of the experiment.

Figure 11A:
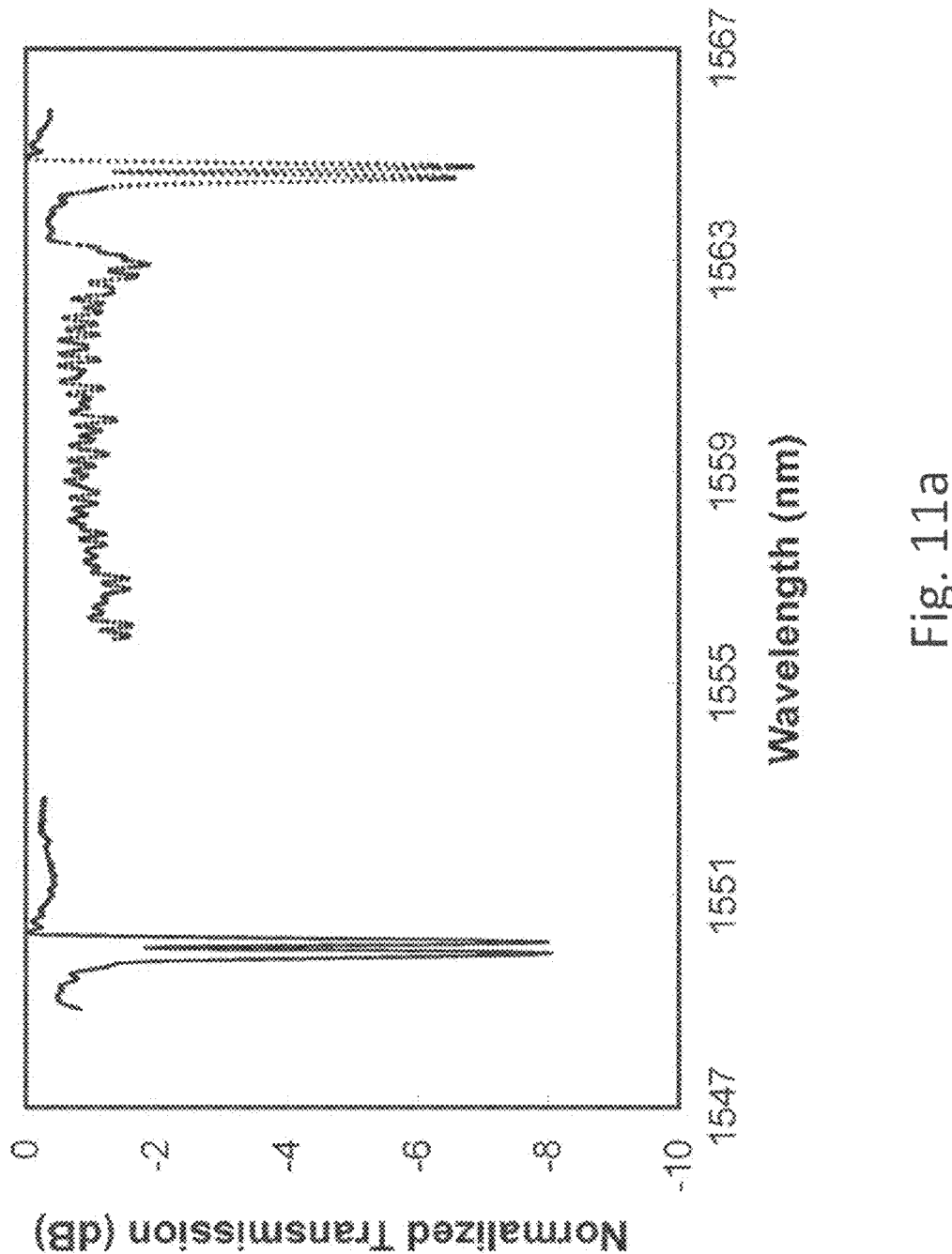
FIG. 11a is the spectral responses of phase shifted grating at room temperature and at $1000°$ C. written using the inventive method.
Figure 11B:
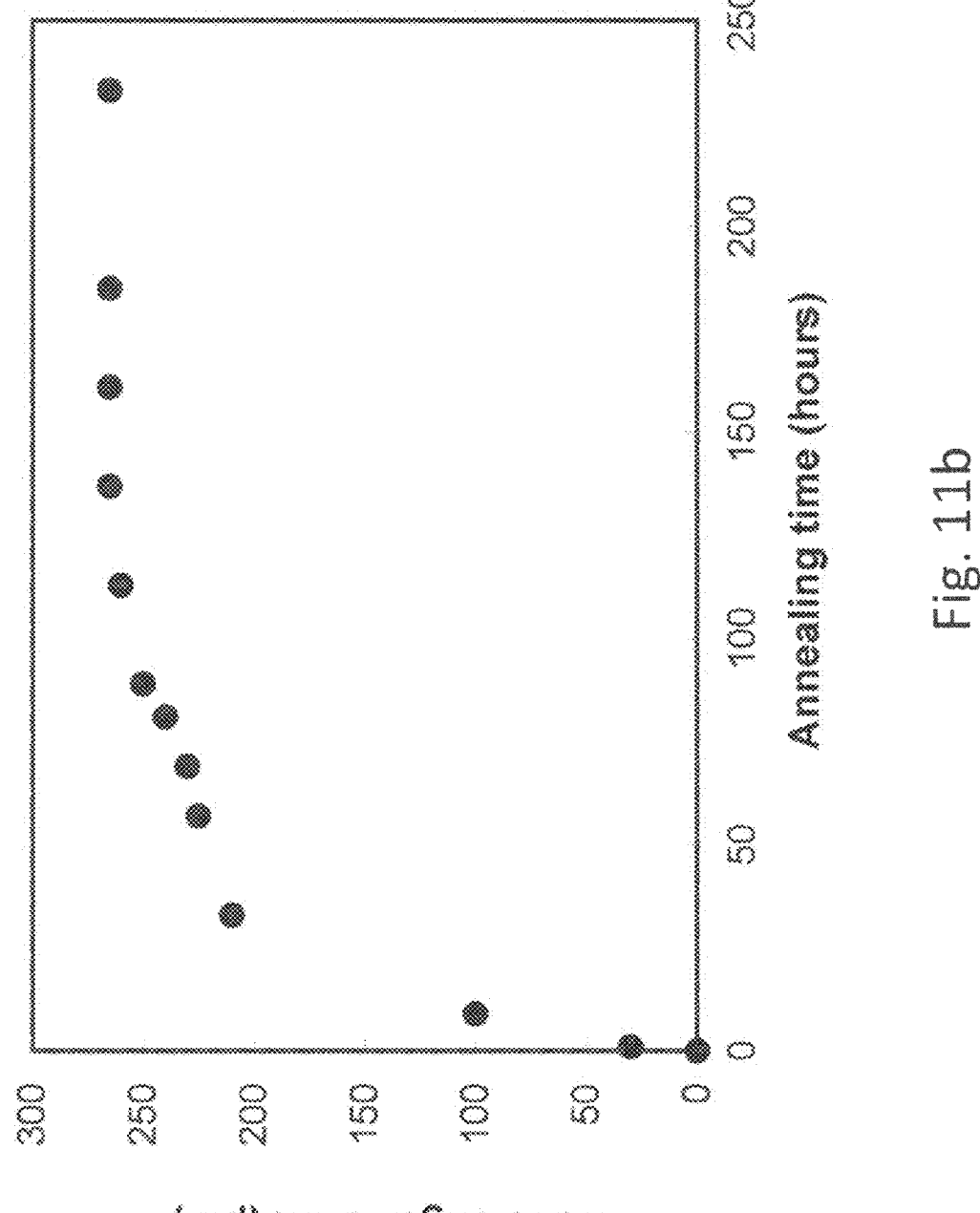
FIG. 11b is the wavelength shift of the central passband within the stopband structure of the grating spectrum as a function of annealing time at $1000°$ C.

As an example, the high-temperature performance of an 8 dB FBG is presented in FIG. 11. FIG. 11(a) shows the spectrum (solid line) of this FBG at room temperature (i.e., T=20° C.) right after the inscription together with its spectrum (dashed line) at T=1000° C. after ~200 cumulative hours of annealing at this temperature. It can be seen that the FBG strength has decreased from ~8 dB to ~7 dB and the FBG spectrum has slightly changed its shape. It is also noted that these transformations took place during the first 25-30 cumulative hours of annealing at 1000° C. and after that the FBG remained unchanged. The wavelength shift of the phase shift feature as a function of annealing time at 1000° C. is presented in FIG. 11(b). Based on these data, the FBG can be considered 'almost' stable and 'absolutely' stable after respectively ~35 and ~100 hours at 1000° C. Such a behavior is also typical of the other FBGs we used in the experiment.

If the guided mode within the fiber that interacts with the phase shifted grating can also interact evanescently with the surrounding environment, then a sensitive chemical sensor is possible. A generated evanescent field surrounding an optical fiber can interact with the ambient environment and be used to sense changes of the ambient refractive index $n_a$ of the surrounding medium. Present in-line fiber evanescent field devices that are transmissive in nature are either based on biconical tapered fiber devices as shown by Villatoro et al. in Electron. Lett. 40, 106 (2004), long period gratings as shown by Allsop et al. in Electron. Lett. 41, 471 (2005) and photonic crystal fiber as shown by Hoo et al. in Appl. Opt. 42, 3509 (2003). To operate in a reflection mode, optical fiber based refractometers need to incorporate a reflective element such as a Bragg grating. FBG-based refractometric devices require the guided mode to be converted to an evanescent field that can interact with the surrounding environment. Such evanescent fields have been created either by polishing the fiber down to the core in the grating region as demonstrated by Schroeder et al. Meas. Sci. Technol. 12, 757 (2001) or chemically etching the fiber to small diameter (10-20 μm) as demonstrated by Iadicicco et al. in IEEE Photon. Technol. Lett. 16, 1149 (2004) or using D-shape fiber as demonstrated by Keren and Horowitz in Opt. Lett. 28, 2037 (2003). These structures need to be created in waveguides that were UV-photosensitive. Recently Silva et al demonstrated such a device in IEEE Photon. Technol. Lett. 25, 401 (2013) where a uniform pitched FBG was fabricated in a 50 μm diameter taper made from standard telecom fiber with a UV femtosecond system and a Talbot interferometer. The device was subsequently coated with palladium making an effective sensor for hydrogen gas.

When tapering silica based fibers, the guided mode becomes cladding-air guided in the tapered region as opposed to core-cladding guided in the untampered single mode fiber when proper conditions are met. For step index single mode fibers, the normalized frequency or V number is given by:

$$V - \frac{2T_r}{A} \sqrt{(n_{co}^2 - n_{cl}^2)} \tag{3}$$

where r is the core radius, A is the wavelength and $n_{co}$ and $n_{cl}$ are the refractive indices of the core and cladding respectively. For single mode operation. $V > 2.405$. When a fiber is tapered, by using the hydrogen flame brushing technique for example (see Bilodeau et al U.S. Pat. No. 4,895,423 incorporated herein by reference) the ratio of cladding/core radii remains constant however V decreases. As disclosed in Love et al IEE Proceedings Journal 138, no. 5, p. 343-354 (1991), incorporated herein by reference, when single mode optical fiber is tapered down such that the normalized frequency or V number of the taper is V<0.84, the fundamental $LP_{01}$ mode is no longer confined to the core but instead is guided by the cladding-air interface resulting in a mode field with the same diameter as the tapered fiber.

In order to minimize coupling of the fundamental mode into higher modes within the taper, the tapering rate along the length of the fiber must be adiabatic. If z is the distance along the taper and n is the local taper radius then the adiabatic condition can be written as:

$$\left|\frac{d\pi}{dz}\right| > \frac{\pi}{z_b}, z_b = \frac{2\pi}{(\beta_1 - \beta_2)} \tag{4}$$

where $z_b$ is a 'beat length', $I_f$ is the propagation constant of the fundamental $LP_{01}$ mode and $I_2$ is the propagation constant for the $LP_{02}$, which is the closest and most likely mode to which coupling will occur.

Fiber claddings are typically silica which is non-UV-photosensitive. Using the femtosecond laser approach for grating inscription removes the constraint of UV-photosensitivity and makes possible the inscription of grating structures across the entire taper cross section of the non-photosensitive silica fiber tapers. Grobnic et al. showed in IEEE Photon. Technol. Lett. 18. 160-162 (2006) that volume FBGs written across the entire cross-sections of 50 and 30 μm diameter tapers could be used for refractometric and fluid level measurements.

Figure 12:
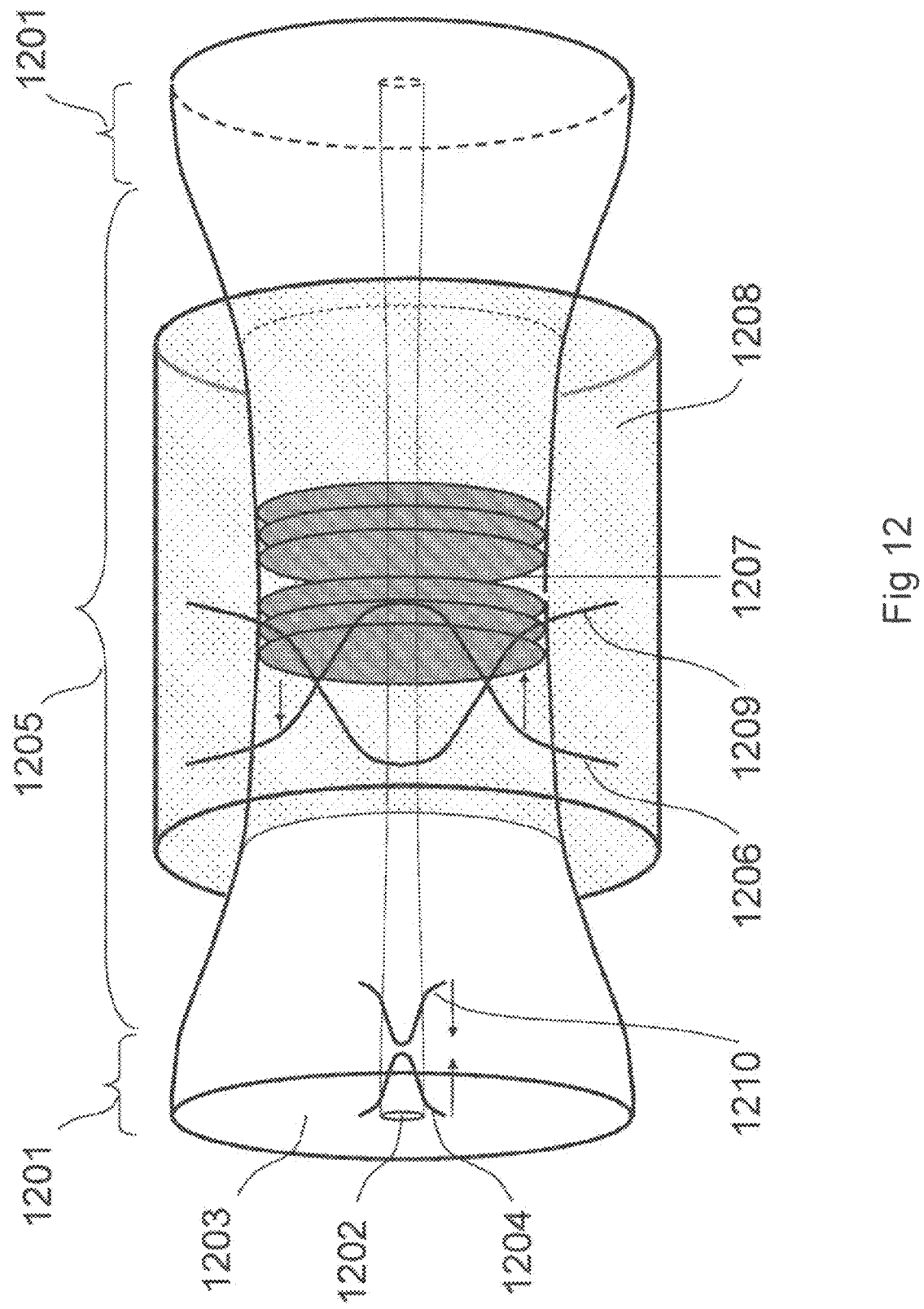
FIG. 12 is a schematic representation of a chemical sensor comprising a T-phase shifted FBG inscribed in a tapered fiber by the described method that is coated with sensing layer that transduces absorption of a chemical analyte into a wavelength shift of the spectral response of the FBG.

FIG. 12 presents a schematic representation of a phase shifted Bragg grating written into a silica fiber taper. An untampered single mode fiber 1201 has a core region 1202 and a cladding region 1203 such that the fundamental $LP_{01}$ mode 1204 is guided by the boundary between the core and cladding region. Within the adiabatic taper region 1205, the mode 1204 is no longer core/cladding guided and expands to become a single mode 1206 that fills the cross-section of the taper. This mode is not tightly confined to the taper cross-section but has some evanescent coupling to the surrounding region. A phase-shifted grating 1207 is inscribed across the cross-section of the taper by the disclosed method herein. The phase-shifted FBG/taper region is then surrounded with a sensing layer 1208, i.e. a material layer that will change either its mechanical or optical properties when exposed to specific environmental conditions or analyte. The effective index $n_{eff}$ of the Bragg resonance of 1207 is then dependent upon the index of the taper which is predominantly that of the fiber cladding $n_{cl}$ and the index of the sensing layer $n_{sl}$ as a result of the evanescent coupling of the expanded $LP_{01}$ mode 1206 into the sensing layer 1208 about the phase shifted grating 1207. Changes in $n_{sl}$ as the result of say absorption of an analyte will be detected by a wavelength shift of the fundamental mode 1209 that is reflected by the grating 1207. The adiabatic nature of the taper ensures that the reflected mode 1209 becomes a single mode 1210 that is core/cladding guided. Incorporation of a phase shift in the grating structure can increase the sensitivity of the device by at least an order of magnitude.

The invention claimed is:

1. A method for inscribing a phase shifted Bragg grating in an optical waveguide, comprising the steps of:
   providing the optical waveguide;
   providing a diffractive optical element which incorporates a phase shift that, when exposed to an ultrashort laser pulse, creates an interference pattern with a phase shift on the optical waveguide;
   wherein the ultrashort laser pulse has a pulse duration of less than or equal to 5 picoseconds, wherein the ultrashort laser pulse has a wavelength in the range from 150 nm to 2.0 microns;
   introducing a beam block to remove the effect of phase-shift splitting; and
   wherein the ultrashort laser pulse irradiates the optical waveguide with the interference pattern produced by the diffractive optical element, with the light intensity in the interference pattern being sufficiently high to cause a permanent change in the index of refraction in the core of the optical waveguide when exposed to a minimum succession of laser pulses, to form a phase shifted Bragg grating.

2. The method according to claim 1 where the phase shifted Bragg grating is a thermally stable type II phase shifted Bragg grating.

3. The method according to claim 2 where the birefringence of the thermally stable type II phase shifted Bragg grating is controlled by varying the polarization of the inscription ultrashort laser pulse with respect to the waveguide axis.

4. The method of claim 1 where the optical waveguide is an actively doped optical fiber.

\* \* \* \* \*